United States Patent [19]
Rider et al.

[11] Patent Number: 5,231,355
[45] Date of Patent: Jul. 27, 1993

[54] LOCATOR TRANSMITTER HAVING AN AUTOMATICALLY TUNED ANTENNA

[75] Inventors: Alan J. Rider; Lester R. Querry, both of Reston, Va.

[73] Assignee: The Charles Machine Works, Inc., Perry, Okla.

[21] Appl. No.: 539,552

[22] Filed: Jun. 18, 1990

[51] Int. Cl.$^5$ .................... G01V 3/11; G01V 3/165; H04B 5/00; H03J 3/02
[52] U.S. Cl. .................... 324/326; 324/67; 324/335; 455/123
[58] Field of Search ............ 324/66, 67, 232, 233, 324/326-329, 335; 379/25; 455/103, 107, 121, 123, 125

[56] References Cited

U.S. PATENT DOCUMENTS

| | | |
|---|---|---|
| 2,658,284 | 11/1953 | Arps . |
| 2,874,274 | 2/1959 | Adams et al. .............. 455/123 X |
| 2,908,863 | 10/1955 | Neff ........................... 324/67 |
| 3,129,386 | 4/1964 | Daly ........................... 455/123 |
| 3,296,494 | 1/1967 | Stenger, Jr. et al. . |
| 3,529,682 | 9/1970 | Coyne et al. . |
| 3,617,865 | 11/1971 | Hakata ...................... 324/326 |
| 3,936,728 | 2/1976 | Ghosh et al. ............... 324/335 |
| 3,988,663 | 10/1976 | Slough et al. ............. 324/67 X |
| 3,991,363 | 11/1976 | Lathrop ..................... 324/67 X |
| 4,039,938 | 8/1977 | Link ........................... 324/528 |
| 4,044,299 | 8/1977 | Weber ....................... 324/67 X |
| 4,161,686 | 7/1979 | Weber ....................... 324/67 X |
| 4,201,960 | 5/1980 | Skutta et al. .............. 455/123 X |
| 4,227,405 | 10/1980 | West ........................... 73/151 |
| 4,230,987 | 10/1980 | Mordwinken ............ 324/233 X |
| 4,295,095 | 10/1981 | Thomas et al. ............ 324/326 |
| 4,308,879 | 12/1981 | Podhrasky ................. 324/329 |
| 4,348,639 | 9/1982 | Karbowski ................. 324/329 |
| 4,387,340 | 6/1983 | Peterman .................. 324/326 |
| 4,438,389 | 3/1984 | De Sa ........................ 324/326 X |
| 4,452,075 | 6/1984 | Bockhorst et al. .......... 73/151 |
| 4,458,204 | 7/1984 | Weber ........................ 324/326 |
| 4,520,317 | 5/1985 | Peterman .................. 324/326 |
| 4,521,913 | 6/1985 | Huber et al. .............. 455/125 X |
| 4,542,344 | 9/1985 | Darilek et al. ............ 324/326 |
| 4,639,674 | 1/1987 | Rippingale ................ 324/67 X |
| 4,652,861 | 3/1987 | Domes ...................... 324/67 X |
| 4,657,477 | 4/1987 | Shinoda . |
| 4,672,321 | 6/1987 | Howell ..................... 324/326 |
| 4,672,686 | 6/1987 | Raoux et al. ............. 455/123 |
| 4,691,204 | 9/1987 | Hiramoto ................ 324/337 X |
| 4,710,708 | 12/1987 | Rorden et al. . |
| 4,774,470 | 9/1988 | Takigawa et al. ......... 324/337 |
| 4,806,869 | 2/1989 | Chau et al. ................ 324/326 |
| 4,837,489 | 6/1989 | McFee ........................ 324/67 |

FOREIGN PATENT DOCUMENTS 0246886 11/1987 European Pat. Off. .
1577742 10/1980 United Kingdom .

OTHER PUBLICATIONS

Dynatel 4420 Power Cable/Fault Locator-Operator's Manual Mar. 1990.
Dynatel 500A/P Cable Locator and Dynatel 573A/P Earth Return Fault and Cable Locator Operator's Manual Apr. 1985.

(List continued on next page.)

Primary Examiner—Gerard R. Strecker
Attorney, Agent, or Firm—Richards, Medlock & Andrews

[57] ABSTRACT

The present invention generally relates to a system for use in determining the location and orientation of concealed underground objects and, more particularly, to an improved locator system having a unique and improved interface with an operator. In accordance with one embodiment of the invention, a magnetic field detector for locating concealed underground objects is provided. The magnetic field detector includes a housing having an upper housing portion and a lower housing portion. A receiver is disposed within said housing for receiving magnetic field signals from the concealed underground objects. A swivel joint couples the upper housing portion and the lower housing portion to permit relative rotational motion.

18 Claims, 27 Drawing Sheets

OTHER PUBLICATIONS

Dynatel 4420 Power Cable/Fault Locator Product Bulletin 1990.
Dynatel 573DX and 573D Sheath Fault/Cable Locators—500D Cable Locator Brochure 1990.
Metrotech Locator Model 810 brochure 1980.
"Cable and Fault Locators Get a Little Smarter", Outside Plant, Aug., 1990.
RD400 Precision Buried Pipe and Cable Precision Locator Mar. 1988.
RD800: Guided Boring Tool Monitor May 10, 1990.
3D-301A Pipe-Cable Locator/Tracer product brochure Mar. 1981.
The Lynch PL-801GX11 Pipeline and Cable Locator Brochure May 31, 1989.
Fisher's M-Scope Model TW-5 Product Brochure Nov. 1979.
"Fault Finder", Industrial Equipment News Magazine, Aug., 1990.

| KEY PRESSED ↓ / CURRENT FUNCTION → | OPERATE | OPMODE | AUDIO | FREQUENCY |
|---|---|---|---|---|
| NONE | MEASURE SIGNAL STRENGTH | MEASURE SIGNAL STRENGTH | MEASURE SIGNAL STRENGTH | MEASURE SIGNAL STRENGTH |
| MODE | SET OPERATE FUNCTION, NEXT MODE | SET OPERATE FUNCTION, NEXT MODE | SET OPERATE FUNCTION, NEXT MODE | SET OPERATE FUNCTION, NEXT MODE |
| FUNC | SET FUNCTION = OPMODE | SET FUNCTION = AUDIO | SET FUNCTION = FREQUENCY | SET FUNCTION = VARIABLE FREQUENCY |
| UP | RAISE GAIN 5% OF FULL SCALE | NEXT OP MODE TWN > NULL > SGL | NEXT AUDIO AM > FM > BOTH | NEXT FREQUENCY SLOT FQ1 > FQ2 > FQ3 > FQ4 |
| DOWN | LOWER GAIN 5% OF FULL SCALE | PREVIOUS OPMODE TWN < NU < SGL | PREVIOUS AUDIO AM < FM < BOTH | PREVIOUS FREQUENCY SLOT FQ1 < FQ2 < FQ3 < FQ4 |
| DEPTH | MEASURE DEPTH AND DISPLAY | MEASURE DEPTH AND DISPLAY | NO ACTION | NO ACTION |
| AUTO SET | SET GAIN FOR 50% SIGNAL STRENGTH | NO ACTION | NO ACTION | NO ACTION |

FIG. 22(C)

| VARIABLE FREQUENCY | VOLUME | RECALL | SAVE |
|---|---|---|---|
| MEASURE SIGNAL STRENGTH | MEASURE SIGNAL STRENGTH | MEASURE SIGNAL STRENGTH | MEASURE SIGNAL STRENGTH |
| SET OPERATE FUNCTION, NEXT MODE | SET OPERATE FUNCTION, NEXT MODE | SET OPERATE FUNCTION, NEXT MODE | SET OPERATE FUNCTION, NEXT MODE |
| SET FUNCTION = VOLUME | SET FUNCTION = RECALL | SET FUNCTION = SAVE | SET FUNCTION = OPERATE |
| RAISE FREQUENCY 1 KHZ | RAISE VOLUME 5 PERCENT | RAISE SLOT INDEX 1 > 2 > 3 | RAISE SLOT INDEX 1 > 2 > 3 |
| LOWER FREQUENCY 1 KHZ | LOWER VOLUME 5 PERCENT | LOWER SLOT INDEX 1 < -- 2 < -- 3 | LOWER SLOT INDEX 1 < -- 2 < -- 3 |
| NO ACTION | NO ACTION | RECALL CONFIGURATION FROM SELECTED SLOT | SAVE CONFIGURATION IN SELECTED SLOT |
| NO ACTION | SET VOLUME TO 50% | NO ACTION | NO ACTION |

FROM FIG. 22(C)

FROM FIG. 22(C)

*FIG. 22(D)*

LOCATOR TRANSMITTER HAVING AN AUTOMATICALLY TUNED ANTENNA

TECHNICAL FIELD

The present invention generally relates to a system for use in determining the location and orientation of concealed underground objects and, more particularly, to an improved locator system having a unique and improved interface with an operator.

BACKGROUND OF THE INVENTION

The interface between a device and its operator is an important, though sometimes underemphasized, feature of the device. As a device includes more operating functions, it becomes increasingly important to consider how such a device may be operated and controlled by an operator. Improvements are of little value if an operator is unable to utilize and implement the improvements. Such inability can result from a lack of understanding of how the improved capabilities are used or from frustration at previous attempts to utilize these features.

The present invention relates to devices which are used to determine the location and orientation of concealed underground conductive objects. Determining the location of such concealed objects as underground gas, sewer and water pipes, power cables, and telephone and CATV cables or conduits is a necessary prerequisite to excavation and/or the laying of new lines, pipes or cables. For simplicity, these underground objects are hereinafter referred to as underground "lines." In some applications, an underground steerable boring tool is utilized to form an underground tunnel through which underground lines are subsequently routed. While utilizing the steerable boring tool, it is important for an operator to trace or keep track of the relative location of the existing underground lines with respect to the boring tool, in order to avoid contacting the existing lines with the tool. In other applications, a trench is excavated and lines are subsequently placed in the open trench. While excavating these trenches, it is equally important for an operator to know the locations of any existing lines in order to avoid contacting them with the excavating equipment.

Special-purpose electromagnetic field detector systems, which are commonly called "locators," have been used for many years to locate and/or trace the path of concealed underground lines. Various types of locators exist, but receivers that detect electromagnetic signals radiating from either the underground lines or a small transmitter located within the boring tool are by far the most widely used. Such radiated signals are generally produced in two ways: (1) an alternating current signal from an above-ground transmitting source is induced into a conductive line thereby generating an electromagnetic field around the line; or (2) a signal is radiated from a small transmitter either mounted inside a boring tool or positioned within a non-conductive line.

Because locating, distinguishing and tracing multiple, concealed underground lines has become increasingly time consuming and costly, it would be desirable to provide more flexible locating techniques and equipment. An improved locating system is described in commonly assigned, copending application Ser. No. 539,851, entitled "An Improved System For Locating Concealed Underground Objects", which application is incorporated herein by reference. As discussed above, it would be desirable to provide an operator interface which permits an operator to take full advantage of the capabilities of this improved system.

Another aspect of the operator interface relates to how information is presented to the operator. Underground boring and line tracing is almost wholly dependent on information presented to an operator. On the basis of this information, the operator determines where digging and boring will be done. Since prior art transmitters and receivers for locating systems have generally included a single analog meter, only a limited amount of information can be presented to an operator. As transmitter locators and receivers become more complex, it would be desirable to provide the operator with more information. Further, it would be desirable to provide this information in a format which is easily recognized and understood by the operator.

The single analog meter of the prior art also presents a problem in determining both the points of maximum and minimum signal. Operators of prior art locators typically observe a needle on the meter while walking with the locator in their hand while attempting to find the place where the signal strength is greatest by a trial and error technique. Some locators have a mode where the source is located by a null or minimum in signal strength. It is very difficult to detect small differences in signal strength since merely moving the locator can cause needle movement. Some prior art locators have a loudspeaker or earphone through which the operator can hear the signal being received. The loudness of the signal is an aid in determining where the signal is strongest. However, the ear is not sensitive to small differences in amplitude and thus the above problems with respect to the analog meter also occur here.

The operator interface also relates to the reliability, convenience, and overall ease of use of the device. Existing locator transmitters and receivers have a number of deficiencies in these areas. Some receivers incorporate a non-metallic pipe structure to house the antennas, and these receivers are inherently prone to job-site damage. Other receivers have a broad "wand" containing circuitry and antennas which provides structural strength but catches the wind and makes it difficult for the operator to hold the receiver in a proper vertical position on windy days.

In addition, some existing receivers have a first mode to trace utility lines and a second mode to track the position of "moles" or underground transmitters. These receivers must be held at an awkward angle by the operator in at least one of the modes of operation. This problem results from the fact that the detected magnetic field has a different orientation depending on whether it is produced by a buried conductor or an underground transmitter. The antennas in the receiver must be held by the operator in a particular orientation relative to the magnetic field. If the receiver is constructed to be convenient for use in detecting magnetic fields from one type of source, such construction will be inconvenient for use in detecting fields from the other type of source.

Also, controls on existing prior art transmitters and receivers are often difficult to use, requiring the operator to use both hands to control and operate the instrument. Typically, the operator must turn knobs to adjust various instrument settings. In a receiver, for example, this is accomplished carrying the receiver in one hand and adjusting the settings in the other. This is both distracting and awkward for the operator.

SUMMARY OF THE INVENTION

Accordingly, it is an object of the present invention to provide an improved interface between an operator and a locator transmitter.

It is a further object of the present invention to provide an improved interface between an operator and a locator receiver.

It is a further object of the present invention to provide an improved locator transmitter that automatically verifies the proper operation of its circuitry.

It is yet another object of the present invention to provide an improved locator transmitter with a high-efficiency transmitting antenna.

It is yet another object of the present invention to provide an improved subsurface transmitter with a high-efficiency transmitting antenna.

It is yet another object of the present invention to provide an improved locator receiver with a reference magnetic field source.

It is yet another object of the present invention to provide an improved locator receiver with stored configurations.

In accordance with the present invention, a magnetic field detector for locating concealed underground objects is provided. The magnetic field detector includes a housing having an upper housing portion and a lower housing portion. A receiver is disposed within said housing for receiving magnetic field signals from the concealed underground objects. A swivel joint couples the upper housing portion and the lower housing portion to permit relative rotational motion therebetween.

Also in accordance with the present invention, a locator transmitter for outputting a signal of a predetermined frequency suitable for tracing underground lines is provided. The locator transmitter comprises an antenna for radiating the signal and a selector for selecting the predetermined frequency of the signal. An automatic tuner is coupled to the antenna and the selector for automatically tuning the antenna in response to a selected frequency.

Also in accordance with the present invention, a locator receiver for use by an operator in a system for detecting concealed underground objects is provided. The locator receiver comprises a detector for detecting electromagnetic signals from a concealed underground object and a voltage generator coupled to the detector for generating a voltage proportional to the strength of the electromagnetic signals from the concealed underground object. A pulse generator is coupled to the voltage generator for generating a series of pulses whose frequency varies in accordance with the voltage generated by the voltage generator. A sound generator is coupled to the pulse generator for generating sound whose frequency is determined in accordance with the frequency of the pulses.

BRIEF DESCRIPTION OF THE DRAWINGS

A more complete appreciation of the present invention and many of the attendant advantages thereof will be readily obtained as the invention becomes better understood by reference to the following detailed description when considered in connection with the accompanying drawings.

FIGS. 22(A) and 22(B) are flow diagrams and FIGS. 22(C) and 22(D) are tables illustrating the operation of the receiver of the present invention.

DETAILED DESCRIPTION OF THE PREFERRED EMBODIMENTS

The commonly assigned, copending application Ser. Nos. 539,851 and 539,616 (which is now abandoned) entitled "An improved System For Locating Concealed Underground Objects" and "An Improved System For Locating Multiple Concealed Underground Objects" contain a complete description of improved locator systems for locating underground objects and the operational details of the transmitter and receiver described below may be found therein. These operational details will be presented below to the extent that they are necessary for an understanding of the present invention.

TRANSMITTER

First Embodiment

Figure 1:
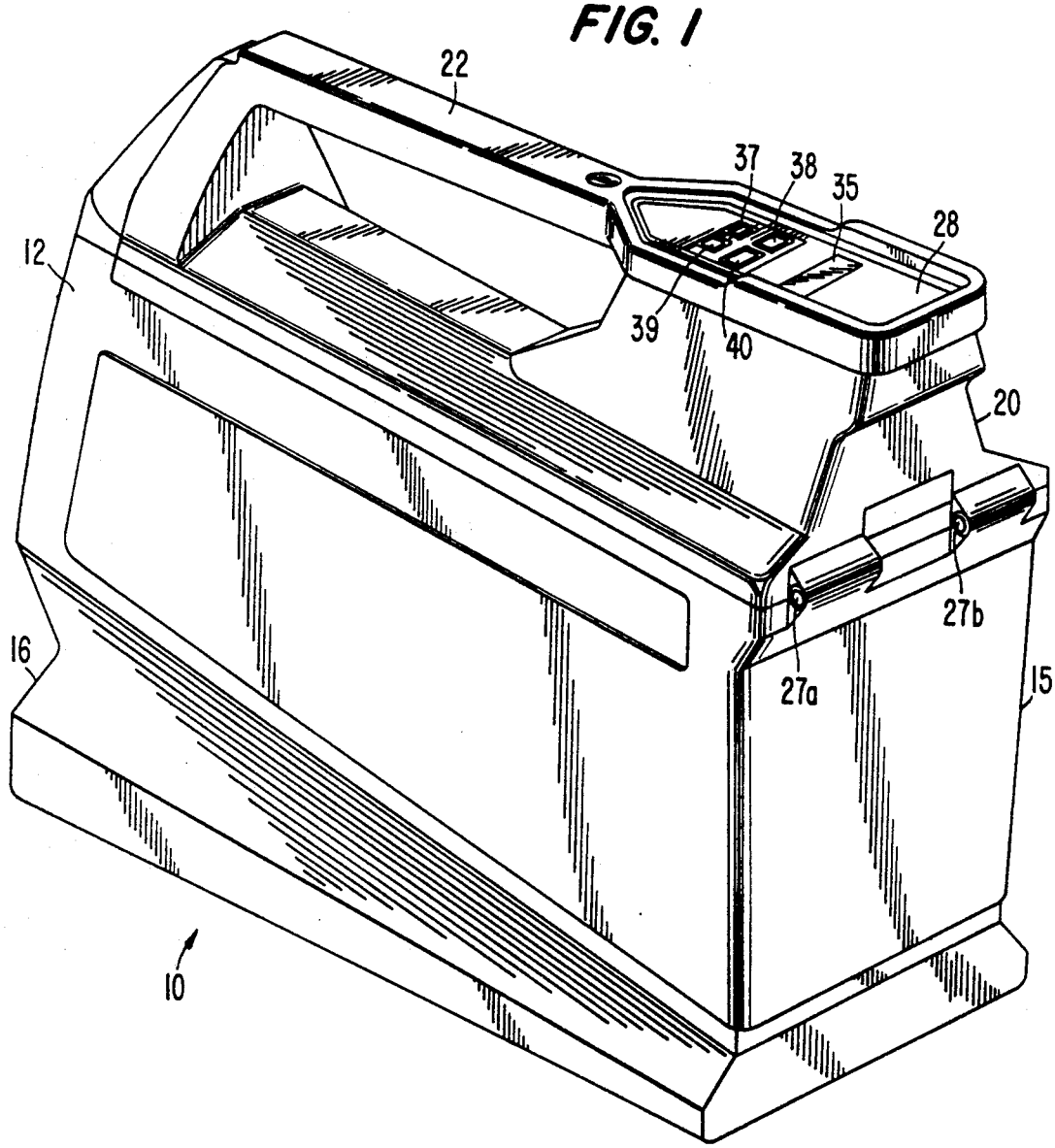
FIG. 1 is a perspective view of a transmitter in accordance with a first embodiment of the present invention.
Figure 2:
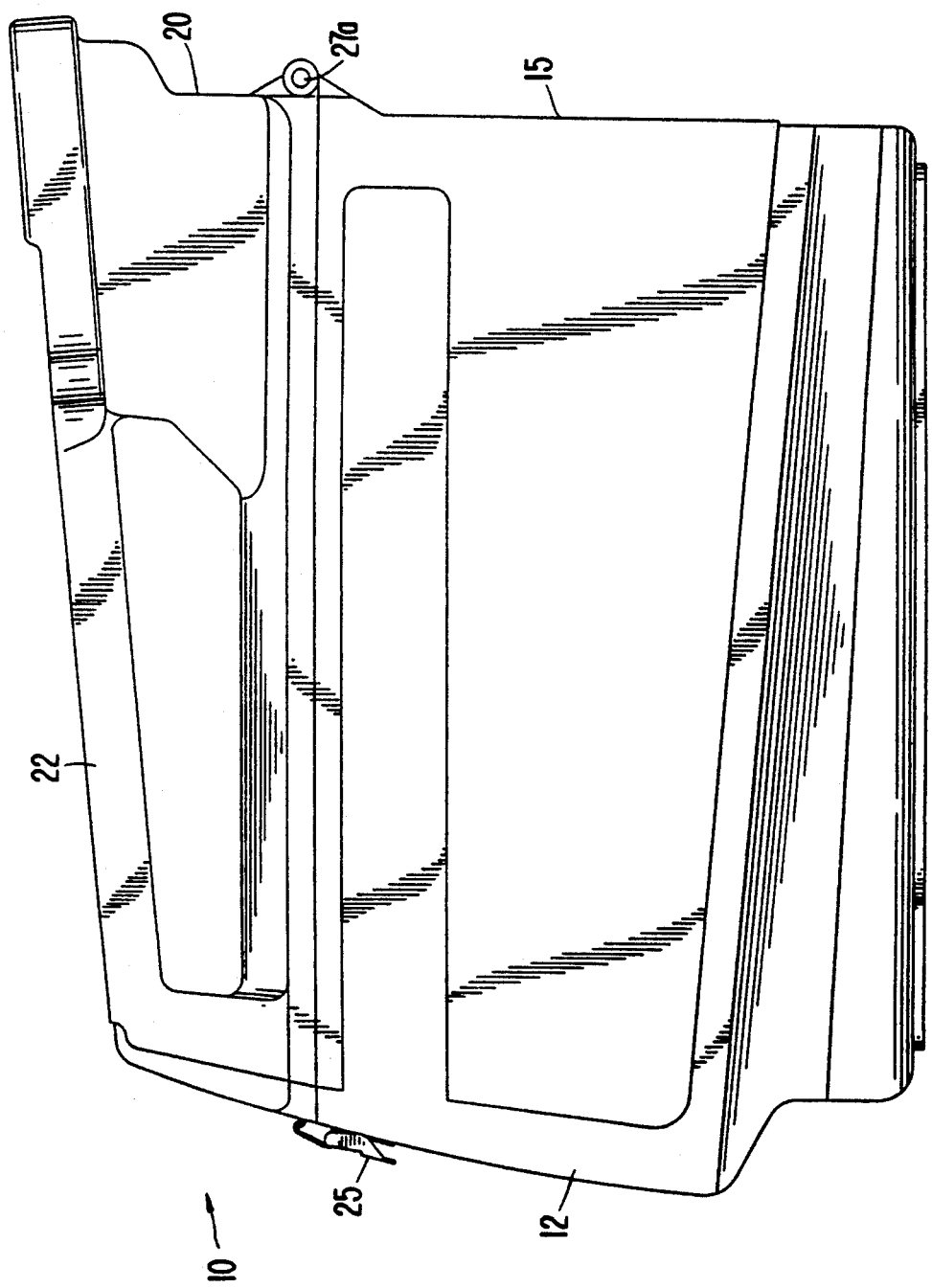
FIG. 2 is a side elevational view of the transmitter of FIG. 1.
Figure 3:
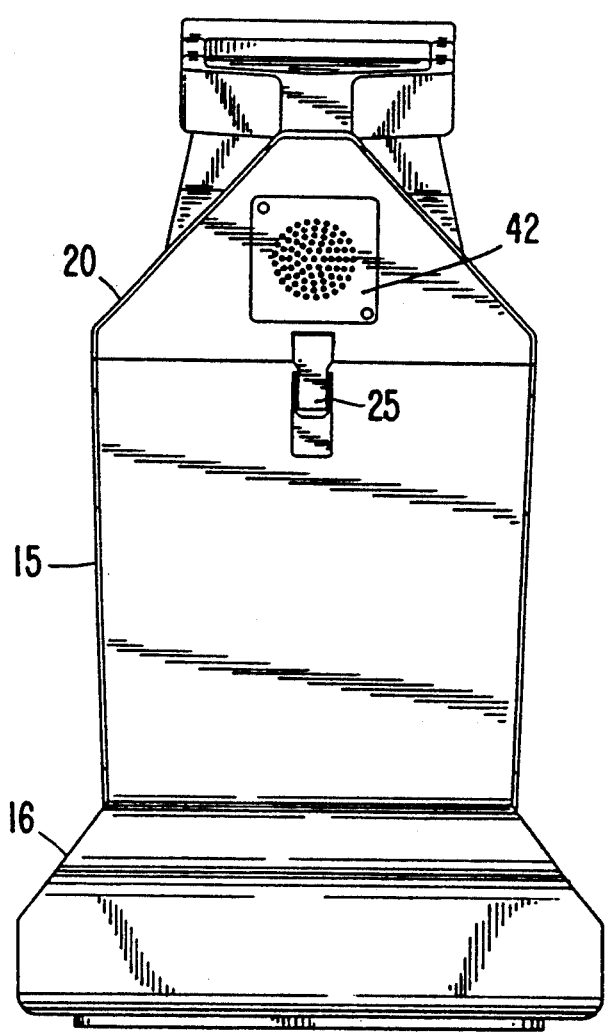
FIG. 3 is a rear view of the transmitter of FIG. 1.
Figure 13:
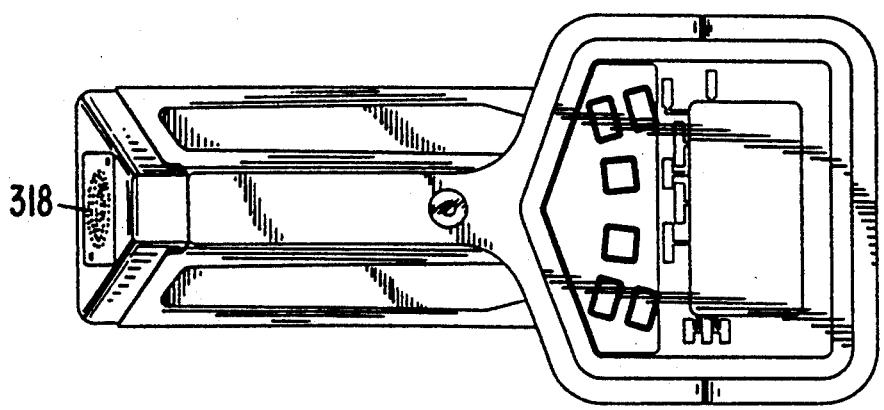
FIG. 13 is a top plan view of the receiver of FIG. 11.
Figure 4:
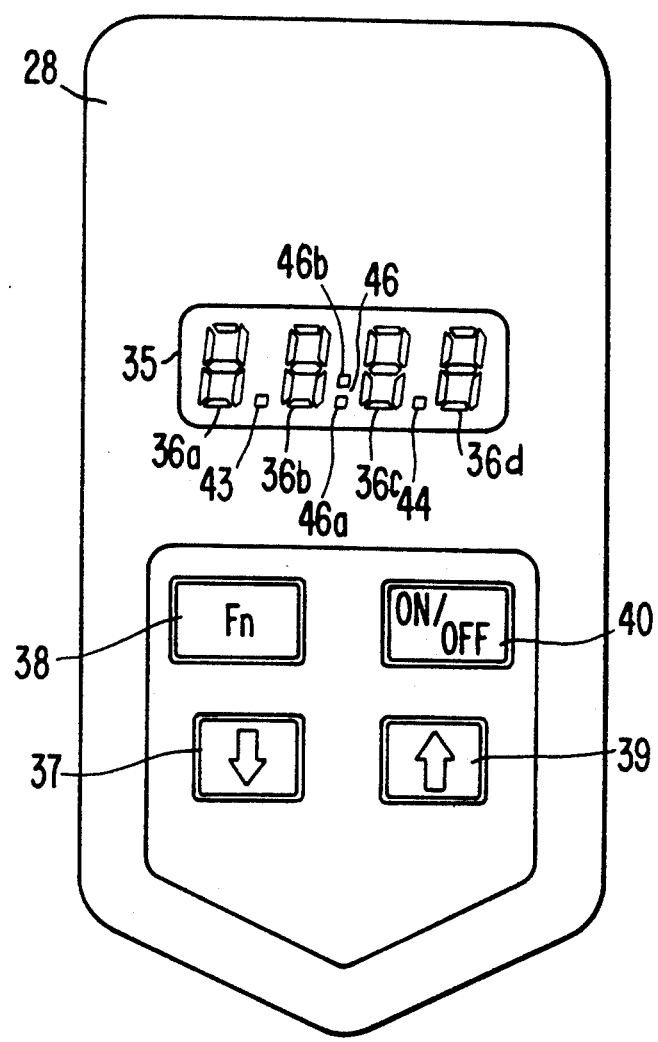
FIG. 4 is an enlarged view of the console of the transmitter of FIG. 1.

With reference to FIGS. 1-4, an improved transmitter in accordance with a first embodiment of the present invention for use in a locating system will be discussed. FIG. 1 is a perspective view of transmitter 10. Transmitter 10 includes a transmitter housing 12. Transmitter housing 12 comprises a lower housing portion 15 and an upper housing portion 20 which are hingedly coupled by hinges 27a and 27b. Lower housing portion 15 includes a flared portion 16 best shown in FIG. 3 which provides stability when the transmitter is disposed on a flat surface. Upper housing portion 20 includes a handle 22 so that the transmitter may be carried by an operator. Handle 22 is preferably configured and dimensioned to accommodate a gloved hand. Lower housing portion 15 includes an internal storage area (not shown) for accessories. The storage area may be accessed by pivoting upper housing portion 20 about hinges 27a and 27b so as to raise upper housing portion 20. Latch 25 secures upper housing portion 20 to lower housing portion 15. An operator console 28 includes a liquid-crystal display (LCD) 35 and control keys 37-40. The details of control keys 37-40 and LCD 35 are illustrated in FIG. 4. The positioning of the control keys and the LCD display relative to handle 22 is shown in FIG. 1. Control keys 37-40 control the entire operation of the transmitter. Preferably, raised outlines are embossed on control keys 37-40 so the control keys can be identified by touch. Keys 37-40 also preferably actuate snap-action switches to provide tactile feedback to an operator.

LCD 35 and a speaker 42 (See FIG. 3) provide information to an operator regarding the operating status of transmitter 10. As shown in FIG. 4, LCD 35 has four seven-segment characters 36a-36d which may be controlled to display numeric characters and a limited set of letters. LCD 35 also includes decimal points 43 and 44. A colon 46 is positioned between character 36b and character 36c. LCD segment 46a may be controlled independently of segment 46b to permit a decimal point to be illuminated between character 36b and character 36c.

Figure 5A:
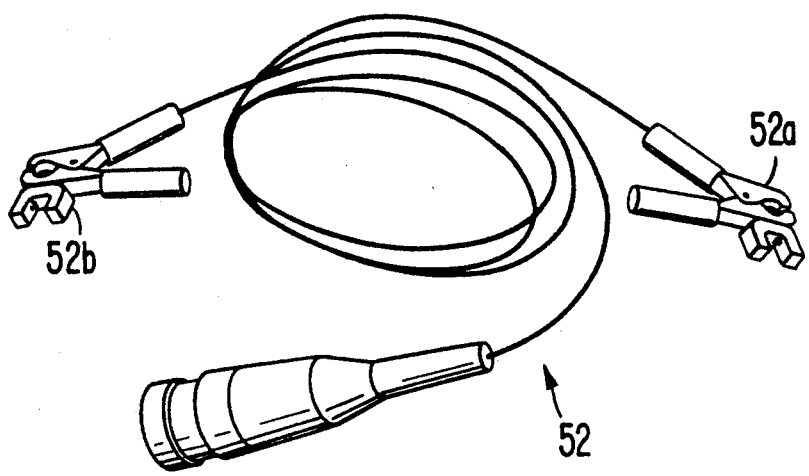
FIGS. 5(a) and 5(b) illustrate accessory cables which may be coupled to the transmitter of FIGS. 1-4.
Figure 5B:
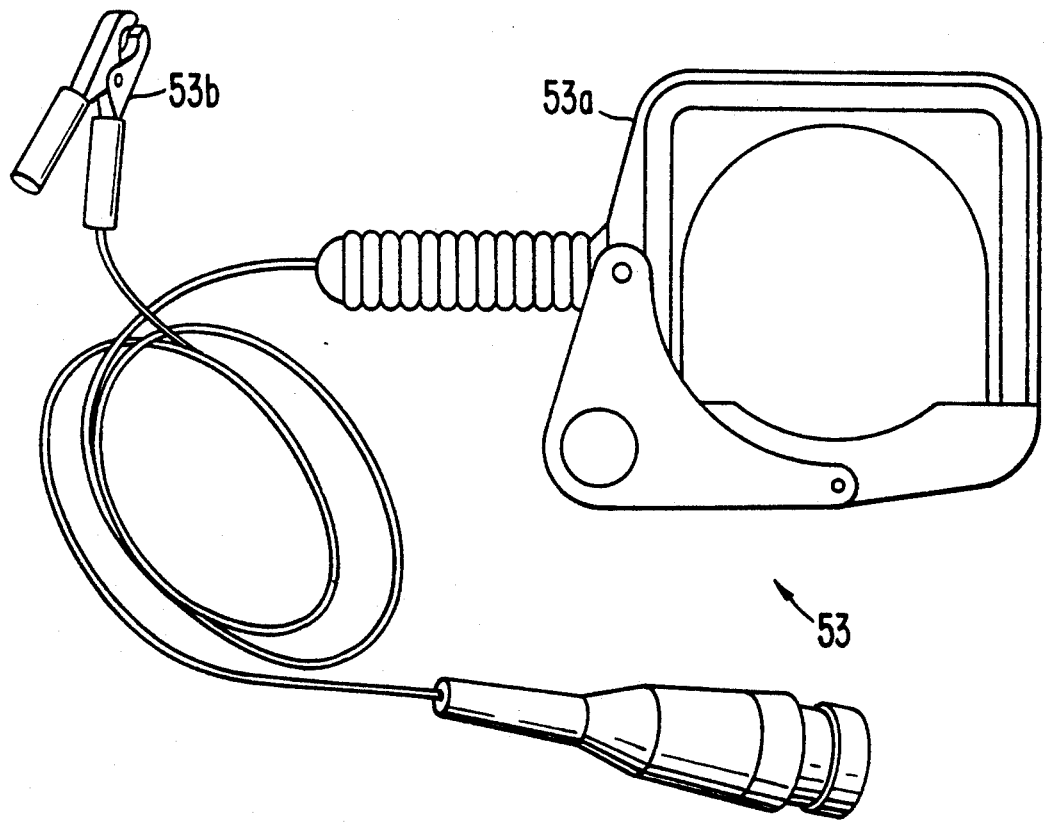

Briefly, when transmitter 10 is operating, a carrier signal having a predetermined frequency is generated by a frequency synthesizer and filtered by a digitally controlled filter. Processor circuitry provides a control signal to an output circuit in order to control the modulation of the output signal of the transmitter. An output signal from the output circuit is coupled to transmitter output jack 50. A microphone 58 (See FIG. 6) may be coupled via a cord to microphone jack 51 so as to provide an audio signal to the output circuit which then modulates the output carrier signal with the audio signal. Thus, an audio signal, such as, for example, a voice signal of an operator may be transmitted along with the carrier signal. The output signal of transmitter 10 can be coupled in different manners so as to permit tracing of underground lines. Output jack 50 allows one of two types of accessory cables 52, 53 shown in FIGS. 5a and 5b to be plugged therein. A first accessory cable 52 is bifurcated and includes a clip 52a on a first branch for direct coupling to a conductor and a clip 52b on a second branch for coupling to a ground stake. A second accessory cable 53 includes a toroidal clamp 53a which can be disposed and secured around an outer surface of a conductor for inducing a signal without direct coupling. A ground clip 53b of cable 53 is a safety clip which is coupled to a ground stake to protect an operator from shock.

When an accessory cable is plugged into output jack 50, the transmitter circuitry senses its presence and couples the output signal to the plugged-in accessory cable. When an accessory cable is not plugged into output jack 50, an internal antenna (not shown) is energized for inducing a signal in buried conductors in the vicinity of the transmitter. The decimal point between characters 36b and 36c switched ON if an accessory cable is plugged into output jack 50 of the transmitter 10.

Figure 6:
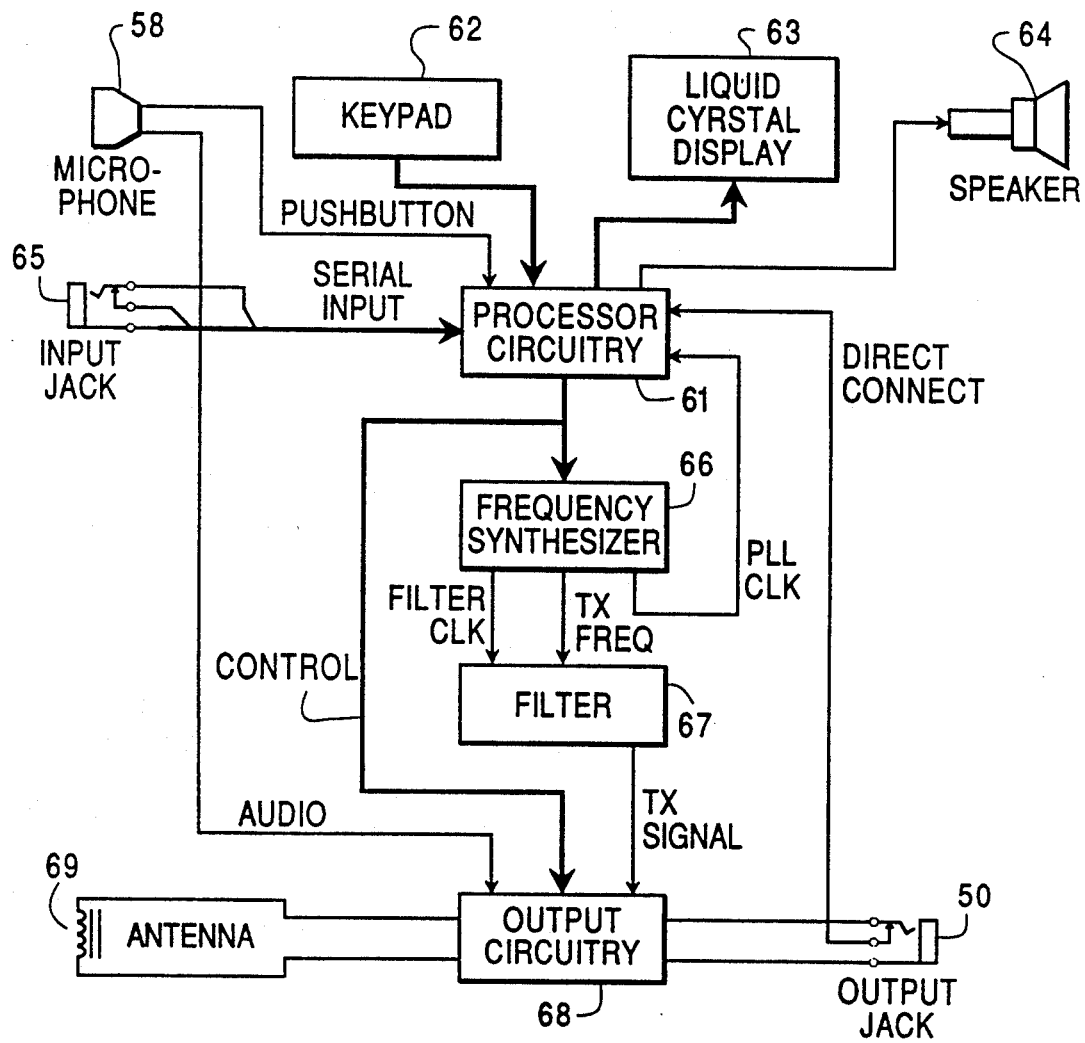
FIG. 6 is a block diagram of the transmitter of FIG. 1.

Referring to FIG. 6, transmitter 10 includes processor circuitry 61 which is a digital processor and associated circuitry that coordinates and controls all functions of transmitter 10. Processor circuitry 61 includes microcontroller 71 (FIG. 7) that provides control signals over control lines to all of the digitally-controlled components of transmitter 10. The specific technique of addressing individual digital circuit components and transferring data to them is well-known and not shown in detail in the drawings. An operator (not shown) inputs commands to transmitter 10 using keypad 62. Transmitter 10 communicates information back to the operator using liquid-crystal display 35 and speaker 42. Input jack 65 is an auxiliary input connection that may be used to couple data in digital form to transmitter 10 from an external source such as, for example, a personal computer for downloading software to be transmitted to the receiver.

The carrier signal supplied by transmitter 10 is generated by frequency synthesizer 66 and filtered by digitally controlled filter 67. Processor circuitry 61 provides a control signal to output circuit 68 in order to control the modulation of the output signal of the transmitter. An output signal from output circuit 68 is coupled to transmitter output jack 50. If no external output cable is connected to output jack 50, the output signal is then coupled from output circuit 68 to antenna circuit 69. Antenna circuit 69 is digitally tuned as discussed in greater detail below to maximize the radiated power over a range of output frequencies. Microphone 58 provides an audio signal to output circuit 68, which modulates the output carrier signal with the audio signal. Thus, an audio signal such as, for example, a voice signal of an operator may be transmitted along with the carrier signal to antennas a compatible in receiver.

Frequency synthesizer 66 produces three output signals under the control of processor circuit 61. The three output signals are: TX FREQ, which represents the frequency of the carrier signal to be transmitted; FILTER CLK, which is provided to tune digital filter 67; and PLL CLK, an internal PLL (phase-lock loop) signal that is coupled back to and monitored by processor circuit 61. The TX FREQ signal provided by frequency synthesizer 66 is a square-wave. This square-wave signal is filtered by filter 67 which removes the harmonics from the square-wave signal TX FREQ and produces a relatively pure, sine-wave output labeled TX SIGNAL. The harmonics are removed in order to limit extraneous signals from frequency synthesizer 66, which may interfere with nearby but unassociated electronic components. Filter 67 is tuned to the frequency of TX FREQ signal by clock signal FILTER CLK from frequency synthesizer 66. If an operator desires to change the frequency of the transmitter carrier signal, the desired change is applied to microcontroller 71 via keypad 62. Microcontroller 71 commands frequency synthesizer 66 to change the frequency of the TX FREQ signal and also change the frequency of the FILTER CLK signal to filter 67, in order to shift the center frequency of filter 67 to that of the new frequency. The detailed description of the structure and operation of frequency synthesizer 66 is disclosed in commonly-assigned, copending patent application Ser. No. 539,616, entitled "An Improved System For Locating Multiple Concealed Underground Objects." Filter 67 is a digitally controlled filter comprising a dual monolithic switched-capacitor filter including two sections which are connected in series and configured as bandpass filters.

Figure 7:
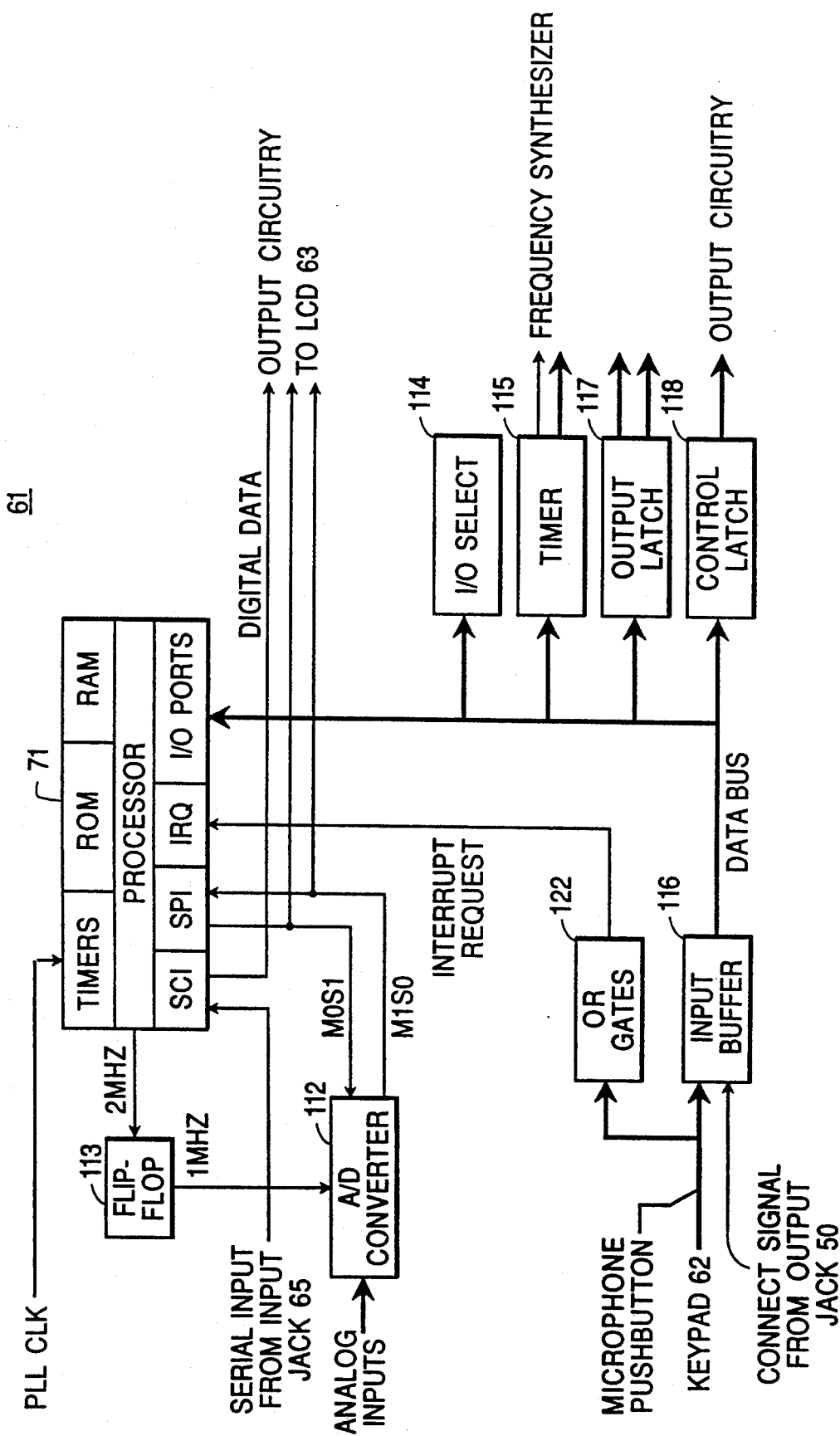
FIG. 7 is a block diagram which illustrates the details of the processing circuitry of FIG. 6.

The details of transmitter processor circuit 61 are shown in FIG. 7. Referring to FIG. 7, microcontroller 71 comprises a processor, read-only memory (ROM), random-access memory (RAM), an asynchronous bidirectional serial communications interface (SCI) integral with a baud rate generator, a synchronous bidirectional serial peripheral interface (SPI), a timer system, and three input-output ports (I/O ports). All of the above-described components may be located on an individual semiconductor chip. In a preferred embodiment of the present invention, microcontroller 71 may, for example, comprise a Motorola MC68HC705C8 type microcontroller. Analog-to-digital (A/D) converter 112, which may, for example, comprise an 11 channel, 8 bit Motorola MC45040P2 type A/D converter, is connected to microcontroller 71 through the microcontroller's bidirectional SPI port. Liquid-crystal display 130 is programmed by microcontroller 71 through the SPI interface, using the MISO and MOSI serial data lines of the SPI port in microcontroller 71. A 1-MHz clock signal for A/D converter 112 is provided by a 74HC74 type flip-flop circuit 113, which divides the microcontroller's crystal-controlled frequency of 2 MHz in half. I/O select circuit 114, which may, for example, comprise a 74HC138 type 1-of-8 decoder, generates input/output select signals from the signals on three of the I/O port lines of microcontroller 71. Programmable timer 115 which may, for example, comprise an 82C54 type programmable timer, includes three internal programmable timers. One internal timer provides a reference frequency signal for frequency synthesizer 66, another is utilized in the feedback loop of frequency synthesizer 66, and the third timer provides the clock signal for digitally controlled filter 67. Output latch 117 and control latch 118 which may, for example, comprise two 74HC374 type latches, are set by microcontroller 71 to control the functions of transmitter 10. OR gate circuit 122 generates an interrupt request (IRQ) which is coupled to the interrupt request port of microcontroller 71. Microcontroller 71 then polls the inputs to OR gate circuit 122 from keypad 62 and a push-to-talk button of the microphone, by using input buffer 116 to determine the source of the interrupt request.

An analog input signal (battery supply) which is to be measured and monitored, is coupled to A/D converter 112, which then provides the battery signal in digital form (MISO) to the SPI in microcontroller 71. However, the present invention is not limited to providing just a battery supply analog input signal. Other analog input signals may be provided to A/D converter 112, such as regulated power supply voltages, circuit board temperature, and transmitter output voltage and output current. As described in more detail below with respect to the transmission of information, these analog input signals may be transmitted along with the normal carrier signal and monitored by a receiver operator at a location remote from the transmitter. The ability to monitor these analog signals at a location remote from the transmitter is a critical feature of the present invention. For example, it is important to monitor the circuit board temperature of a subterranean transmitter. A high circuit board temperature may indicate overheating with respect to a fluid-assisted boring device if the fluid jets are plugged. Also, such overheating may occur with a percussion boring device as it is withdrawn from a borehole, since the soil heat-sink effect is reduced while withdrawing the tool from a hole as compared to the heat-sink effect encountered in forming the hole. In such overheated conditions, a conventional subterranean transmitter could "melt down" if the drilling were to continue.

Figure 8:
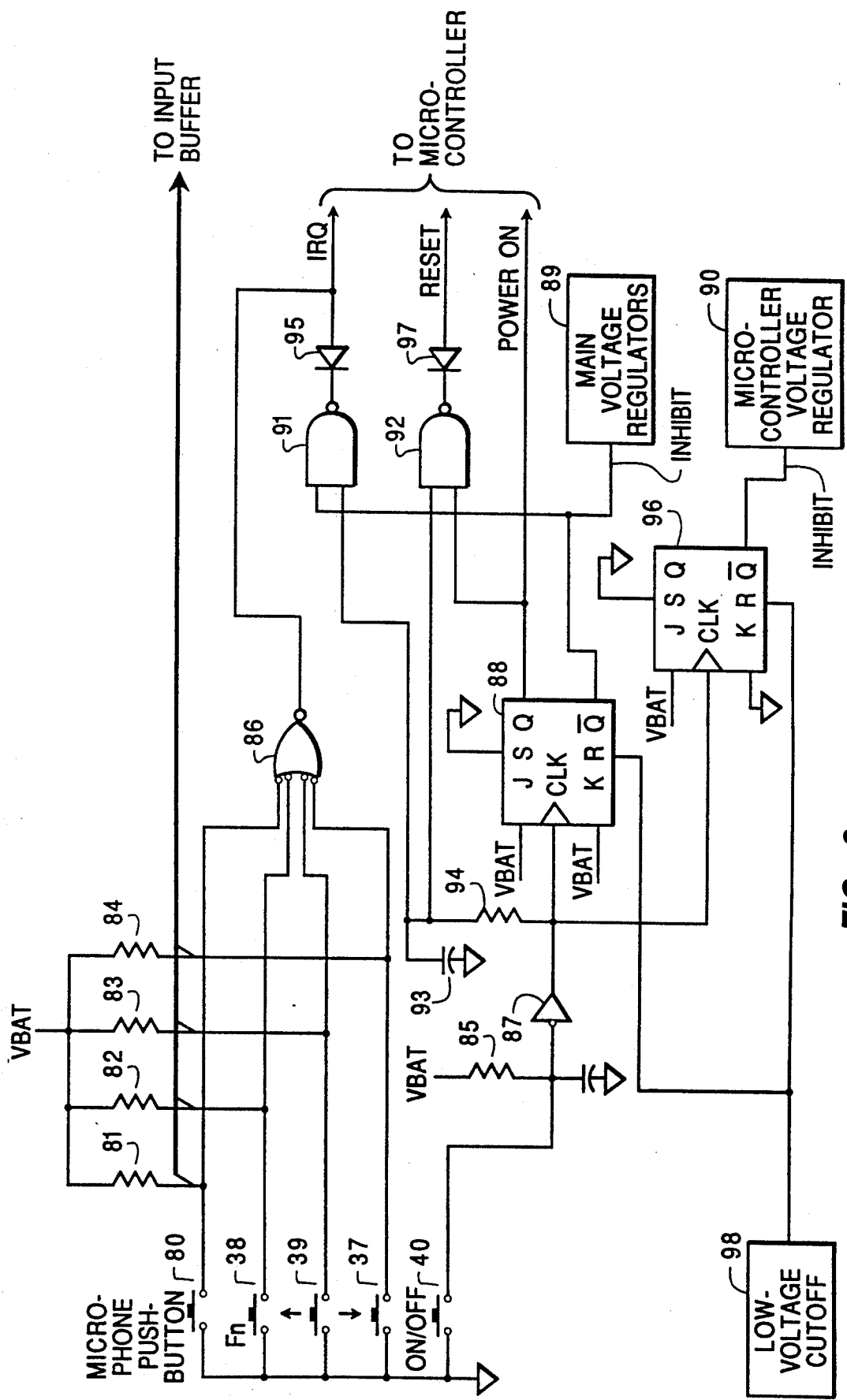
FIG. 8 is a simplified schematic diagram of the circuitry associated with the microphone push-button and keypad of FIG. 7.

FIG. 8 is a simplified schematic diagram of the circuitry associated with the microphone push-button and keypad of FIG. 7. The circuitry illustrated in FIG. 8 includes interrupt gating and a power control circuit. Microphone push-button 80 has an associated pull-up resistor 81. Function key 38 has an associated pull-up resistor 82. Up-arrow key 39 has an associated pull-up resistor 83. Down-arrow key 37 has an associated pull-up resistor 84. ON/OFF key 40 has an associated pull-up resistor 85. Microphone push-button 80 and keys 37, 38, and 39 are coupled to the inputs of low-active OR gate 86. When transmitter 10 is operating and push-button 80 or one of the keys 37, 38, or 39 is pressed or actuated by an operator, OR gate 86 generates an interrupt request by pulling line IRQ low. In response to the interrupt request, micro-controller 71 polls the lines coupled to push button 80 and keys 37, 38, 39 through the input buffer 76 to determine the source of the interrupt. Micro-controller 71 controls the transmitter in accordance with the source of the interrupt as described in detail below.

When transmitter 10 is ON and the operator presses ON/OFF key 40, the output of inverter 87 goes high and clocks 4027-type J-K flip-flop 88. Since the J and K inputs of flip-flop 88 are tied high, the outputs of flip-flop 88 change state and output not-Q (Q) goes high. The high not-Q output inhibits main voltage regulators 89, switching OFF power to all transmitter circuitry except to the circuitry shown in FIG. 8 which is always connected to the battery and to micro-controller 71, which has a separate voltage regulator 90. At the same time, the not-Q output of flip-flop 88 which is coupled to one input of NAND gate 91 also goes high. Signal POWER ON, which is the Q output of flip-flop 88, goes low. The Q output of flip-flop 88 is also supplied to one input of NAND gate 92. A short while later, when capacitor 93 has been discharged by resistor 94, the other input of NAND gate 91 goes high and thus the output of NAND gate 91 goes low. This pulls the interrupt request line IRQ low through diode 95. In response to the interrupt request, micro-controller 71 determines that the POWER ON line is low. Micro-controller 71 then stores configuration information as discussed in greater detail below in its internal RAM (see FIG. 7) and stops transmitter operation to conserve power.

When the output of inverter 87 goes high in response to the operator pressing ON/OFF key 40 when transmitter 10 is ON, 4027-type J-K flip-flop 96 is also clocked. Since the J input of flip-flop 96 is tied high and the K input is tied low, the not-Q output stays low and micro-controller voltage regulator 90 continues to operate, maintaining the configuration information stored in the internal RAM of micro-controller 71.

When the operator again presses the ON/OFF key to switch the transmitter ON, the outputs of flip-flop 88 again change state, the Q output going high and the not-Q output going low. Main voltage regulators 89 are thereby enabled and power is restored to the transmitter circuitry. One input of NAND gate 92 goes high, and a short time later, when capacitor 93 has been discharged by resistor 94, the other input of NAND gate 92 goes high. The output of NAND gate 92 pulls the micro-controller RESET line low through diode 97. Micro-controller 71 is switched On and restores the previous configuration of the transmitter from the information stored in its internal RAM.

To prevent the battery from being completely discharged, TLC7721-type low-voltage cutoff 98 resets both flip-flop 88 and flip-flop 96 if the battery voltage drops below a predetermined value. This switches OFF power to all circuit components except the static CMOS components of FIG. 5, which draw very little current.

Figure 9:
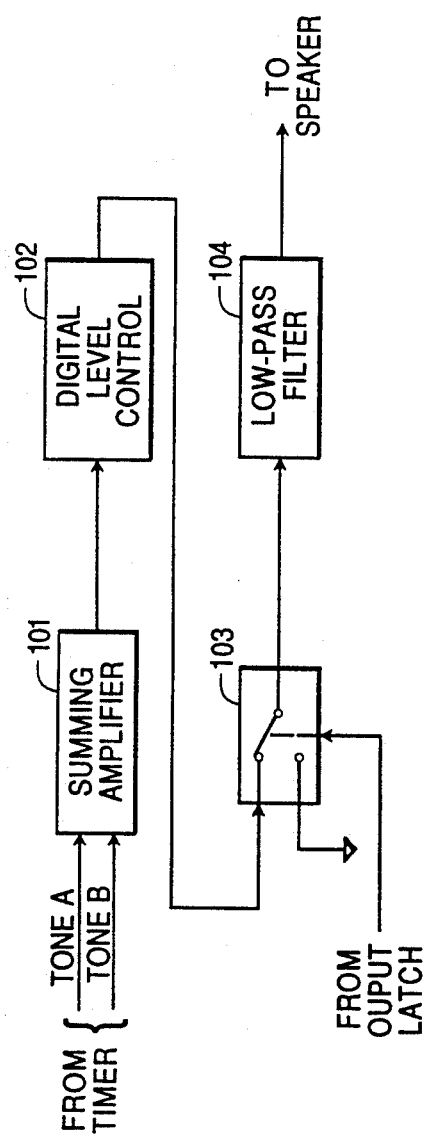
FIG. 9 is a block diagram of circuitry associated with speaker 64 of FIG. 6.

FIG. 9 is a block diagram of circuitry associated with speaker 64 of FIG. 6. Two square-wave signals designated TONE A and TONE B are generated in timer 75 of FIG. 7. Signals TONE A and TONE B are combined in summing amplifier 101 and are supplied to digital level control 102, which may be one channel of a TLC7528-type dual multiplying digital-to-analog converter. The output of digital level control 102 is supplied to one input of analog switch 103. Analog switch 103 is controlled by a control line from output latch 78 of FIG. 7. The other input of switch 103 is grounded. The output of switch 103 is supplied to low-pass filter 104 to remove harmonics from the signal. The output of low-pass filter 104 is supplied to speaker 64 of FIG. 6.

Signal TONE A sets the frequency of the beeps sounded by speaker 64. Signal TONE B sets the frequency with which the beeps are switched ON and OFF. Digital level control 102 sets the volume of the speaker output under the control of micro-controller 71. The control input for switch 103 turns the beeps on and off under the control of micro-controller 71.

Interface Between Operator and Transmitter

Keys 37–40 function to provide a consistent, user-friendly interface between transmitter 10 and the operator. The keys are marked ON/OFF, Fn, and two arrows: an up-arrow and a down-arrow. The ON/OFF key 40 serves to switch power ON and OFF and also initiates software functions both when pressed to switch power ON and when pressed to switch power OFF. When the ON/OFF key is pressed to switch power ON, a Power-On Self-Test (POST) is automatically initiated and the previous configuration settings are restored as noted above. When the ON/OFF key is pressed again, the current configuration settings of the transmitter are saved in RAM of micro-controller 71 before power is actually switched OFF.

The Fn key 38 is a sequential step key. Each time the Fn key is pressed, transmitter 10 steps to the next of a sequence of functions. The various function steps comprise a loop. That is, when the last function is reached, pressing the Fn key steps the transmitter to the first function.

The Up-arrow key 39 and Down-arrow key 37 are used (1) to step through the selections within a particular function and (2) to raise and lower adjustments such as transmitter output power and frequency. Pressing the Fn key following the use of one of the arrow keys returns to the first function.

Transmitter Functions

The various functions available in the transmitter of the first embodiment of the invention will now be described. The first function sets the power level of the output signal at output jack 50. (The power level is always the same when the internal antenna is being used.) In this function, micro-controller 71 controls LCD 35 to display "PL:xx", where xx represents a numeric display of the power level. Ten power levels are available, the corresponding displayed numbers being 01 through 10. Preferably, the power levels are equally spaced. In the power level function, the Up-arrow and Down-arrow keys may be used to step through the power level settings. Actuation of the Up-arrow key increments the power level and actuation of the Down-arrow key decrements the power level.

The second function is used for selecting the frequency of the output signal. In this function, micro-controller 71 controls LCD 35 to display "F-:xx", where xx represents a numeric display of the approximate frequency in kilohertz. Preferably, four frequencies are available, the available frequencies depending on both the local power frequency (e.g. 50 Hz or 60 Hz) and on the nominal frequencies programmed in the firmware at the time of manufacture. In the frequency function, the Up-arrow and the Down-arrow keys may be used to step through the available frequencies. Actuation of the Up-arrow key steps through the available frequencies in a pre-determined sequence and actuation of the Down-arrow key steps through frequencies in the reverse sequence. The transmitter returns to the power level function when the Fn key is pressed after an arrow key is pressed.

The third function is used for selecting an ID code as described in detail in the above-referenced application entitled "An Improved System For Locating Concealed Underground Objects" (Ser. No. 539,851) ID codes are utilized to identify a unique signal of a particular transmitter. Different ID codes may also be used to distinguish between different signals from multiple transmitters or different ID codes may be provided simultaneously by multiple outputs of a single transmitter. In this function, micro-controller 111 controls LCD 35 to display "Id:xx", where xx represents a numeric display of the selected ID code. In a preferred embodiment, there are 31 ID codes available with displayed numbers 01 through 31. Setting the ID code to 00 disables transmission of an ID code. In the ID code function, the Up-arrow and Down-arrow keys may be used to step through the ID codes. Actuation of the Up-arrow key increments the ID code number and actuation of the Down-arrow key decrements the ID code number. Transmitter 10 returns to the power level function when the Fn key is pressed after an arrow key is pressed.

Set-Up Mode

In addition to the above operating functions, there is a Setup Mode, which is entered by holding down the Fn key when ON/OFF key 40 is pressed. After the Setup Mode has been entered, pressing the Fn key steps through the following setup options.

The first setup option is auto-shutdown time. Auto-shutdown time is a predetermined length of time from when the last key was pressed after which the transmitter will switch itself OFF. If the transmitter switches itself OFF by auto-shutdown, the configuration settings are maintained in RAM of micro-controller 71. If, for example, the auto-shutdown time is sixty minutes, the transmitter will switch itself OFF sixty minutes after the last key is pressed. In this option, micro-controller 71 controls LCD 35 to display "AS:xx" where xx represents the auto-shutdown time in minutes. In a preferred embodiment, three selections are programmed including a selection for disabling auto-shutdown. In this option, the Up-arrow and the Down-arrow keys may be used to step through the programmed auto-shutdown times. Actuation of the Up-arrow key steps through the programmed selections in a predetermined sequence and actuation of the Down-arrow key steps through the selections in the reverse sequence. Preferably, the programmed times are: 60 minutes (LCD display "AS:60") which is the default selection; 30 minutes (LCD display "AS:30"); and auto-shutdown disabled (LCD display "AS:d").

The second setup option relates to the transmission of a product code along with the subcarrier. This feature is discussed in the above-referenced application entitled "An Improved System For Locating Concealed Underground Objects" (Ser. No. 539,851). A product code identifies a particular type of transmitter (e.g. a particular model of above-ground transmitter or a subsurface transmitter). A receiver in accordance with the invention of the above-referenced application entitled "An Improved System For Locating Concealed Underground Objects" (Ser. No. 539,851) is capable of automatically and optimally configuring itself to operate compatibly with the particular type of transmitter. In this function, micro-controller 71 controls LCD 35 to display "PC:xx" where xx indicates whether the product code feature is enabled or disabled. The operator can toggle between two states using the Up-arrow key or Down-arrow key: product code disabled (LCD display "PC: d", default selection) and product code enabled (LCD display "PC:On").

The third setup option relates to the local power frequency. As discussed in commonly assigned copending application Ser. No. 539,616 entitled "An Improved System For Locating Multiple Concealed Underground Objects", the frequency of the carrier signal maybe chosen to avoid harmonics of the local power frequency or noise. In accordance with a preferred embodiment, two sets of four frequencies are stored. A first set of four frequencies is chosen for a local line frequency of 60 Hz and a second set of four frequencies is chosen for a local line frequency of 50 Hz. In this option, micro-controller 71 controls LCD 35 to display "LF:xx" where xx is the local line frequency in Hertz. In a preferred embodiment, the operator can toggle between the two states by using the Up-arrow key or the Down-arrow key: 60 Hz (LCD display "LF:60", default for U.S.A.) and 50 Hz (LCD display "LF:50").

The fourth setup option relates to service tests which are not for operator use. A service test may for example comprise repeated execution of the POST set described below. The LCD 35 may be incremented for each completed execution. The test may stop on detection of an error and LCD 35 can display the error code. Service tests may also be implemented to debug hardware and software. The Up-arrow key steps through the tests in ascending numeric order and the Down-arrow key steps through the tests in descending order. In a preferred embodiment, there are five selections: no diagnostic (LCD display "Sd: d"); service diagnostic No. 1(LCD display "Sd: 1"); service diagnostic No. 2 (LCD display "Sd: 2"); service diagnostic No. 3 (LCD display "Sd: 3"); and service diagnostic No. 4 (LCD display "Sd: 4"). The selected test is executed when the Fn key is pressed.

A fifth option in the Setup Mode relates to storing the selections made in the above options and exiting from the program (LCD display "End"). Pressing the Up-arrow key or Down-arrow key in this step stores the selected setup options in memory and exits to the Power Level function. If the Fn key is pressed again instead of one of the arrow keys, the instrument returns to the auto-shutdown time setup option.

When power is switched OFF (but the battery is not removed), all the above-described user determined settings and internal operational parameters are saved in RAM of micro-controller 71 as described above. When the power is switched ON, the transmitter resumes operation utilizing exactly the same settings. When power is switched ON, the transmitter performs a comprehensive self-test sequence to insure operational fitness.

Self Integrity Tests

At appropriate times during normal operation, transmitter 10 performs Self-Integrity Tests (SIT) to ensure proper operation. In the event the SIT discovers a problem, the operator is notified by means of three audio beeps generated by the circuit of FIG. 9 and the display of "Exxx" on LCD 35, where xxx are numerals. The first two numerical digits indicate the identity number of the software module which discovered the problem and the third digit is the particular error code. The operator must switch the unit OFF and then switch it back ON to clear the error condition and resume operation.

The audio beep signal is generated by micro-controller 71 for alerting the operator to the operating conditions of the transmitter. In a preferred embodiment, the transmitter sounds a single beep every ten seconds to signal the operator that it is operative. The transmitter sounds two beeps upon satisfactory completion of the POST. The transmitter sounds three beeps whenever a SIT failure occurs. The generation of these audible indicators provides a user-friendly indication of the status of the transmitter. The beeps at ten second intervals provide positive reinforcement to the operator that the transmitter is operating normally. The two beeps upon satisfactory completion of the POST indicates to the operator that the transmitter is operating properly upon power-up. Finally, the three beeps instantly alert the operator to a transmitter malfunction.

POST Tests

When ON/OFF key 40 is pressed, a Power On Self Test (POST) is automatically initiated. This sequence of tests determines whether various components of the transmitter are operational.

It should be noted that self-integrity testing is meant to encompass both self-integrity testing at appropriate times during operation and upon power up, i.e. POST. Thus, POST are self-integrity tests commenced upon power up.

The first of the POST tests is the LCD test, which blanks LCD 35 for one second, switches ON all display segments for one second, and then blanks the display.

The next POST test checks the read-only memory (ROM) of micro-controller 71, which contains the operating program for the transmitter. When transmitter 10 is programmed, the complement of the sum of all the bytes in memory is stored with the program so the byte sum is zero. The test sums all bytes in the ROM of micro-controller 71 and checks that the resulting byte sum is zero.

The next POST test checks all bytes of RAM by first reading a byte from a particular address and saving it and the memory location in a register. A hexadecimal "55" is then written to that address and it is read back to verify that it is correct. A hex "AA" is similarly written and read. Finally, the original byte is written back to the memory location from which the original byte was read.

The next POST test flushes the keystroke buffer and determines if any of the keys is stuck.

The next POST test sets the frequency synthesizer to a particular frequency and then measures the generated frequency. The measured frequency is then compared with the intended frequency. This test is then repeated for a second frequency.

The final POST test is a measurement of the battery voltage, which is measured with an analog-to-digital converter as described above. An error is signalled if the voltage is below a predetermined minimum. Battery power condition is checked during POST and is monitored routinely in the SIT tests. When the battery is low, the speaker sounds three beeps and LCD 35 shows "LO BA". Operation continues normally. Keying of any key returns the display to normal.

If an error is detected during POST, the operator is informed by three beeps and a display on LCD 35.

With earlier locator transmitters, the operator had no way to ensure the transmitter was functioning correctly. With the greater complexity of digitally controlled instruments, there are more instrument components which must be checked for proper operation. The present invention provides an approach for verifying correct operation of the transmitter by programming transmitter to check its own operation, both when the transmitter is switched ON and at regular intervals during transmitter operation. This approach assures the operator that the transmitter is operating correctly at all times. Further, when an error occurs during use of the transmitter, the operator is promptly informed that a malfunction exists and is given a prompt as to where the malfunction has arisen.

The convenient hinged housing of the transmitter provides a storage area for storing accessories and provides ready access to the storage area. The consistent usage of the function key and of the arrow keys within each function provide a user-friendly quality to the interface between the operator and the transmitter. This interface is further enhanced by the wide variety of information presented on the LCD in an easily understood format.

Transmitter Antenna

Figure 10:
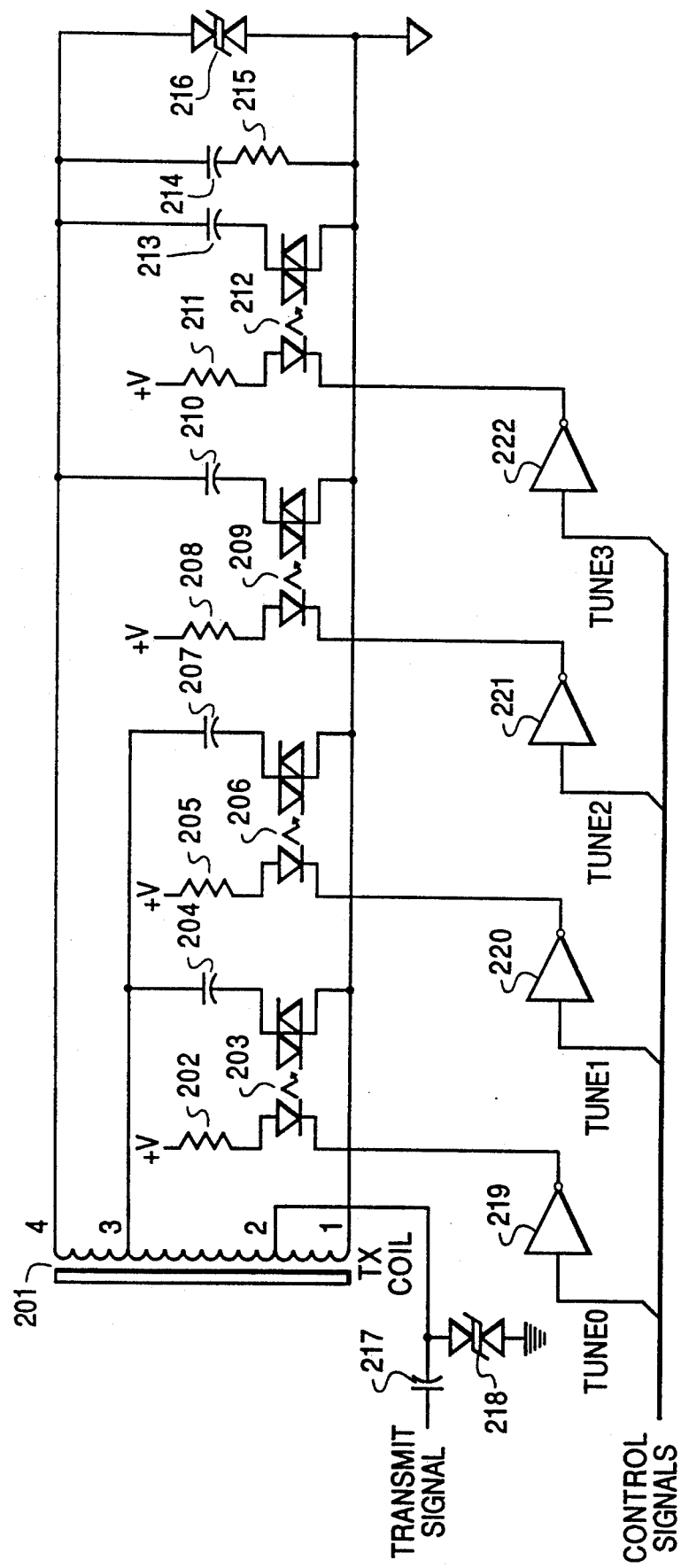
FIG. 10 is a schematic diagram of a transmitting antenna for use with the transmitter of FIG. 1.
Figure 11:
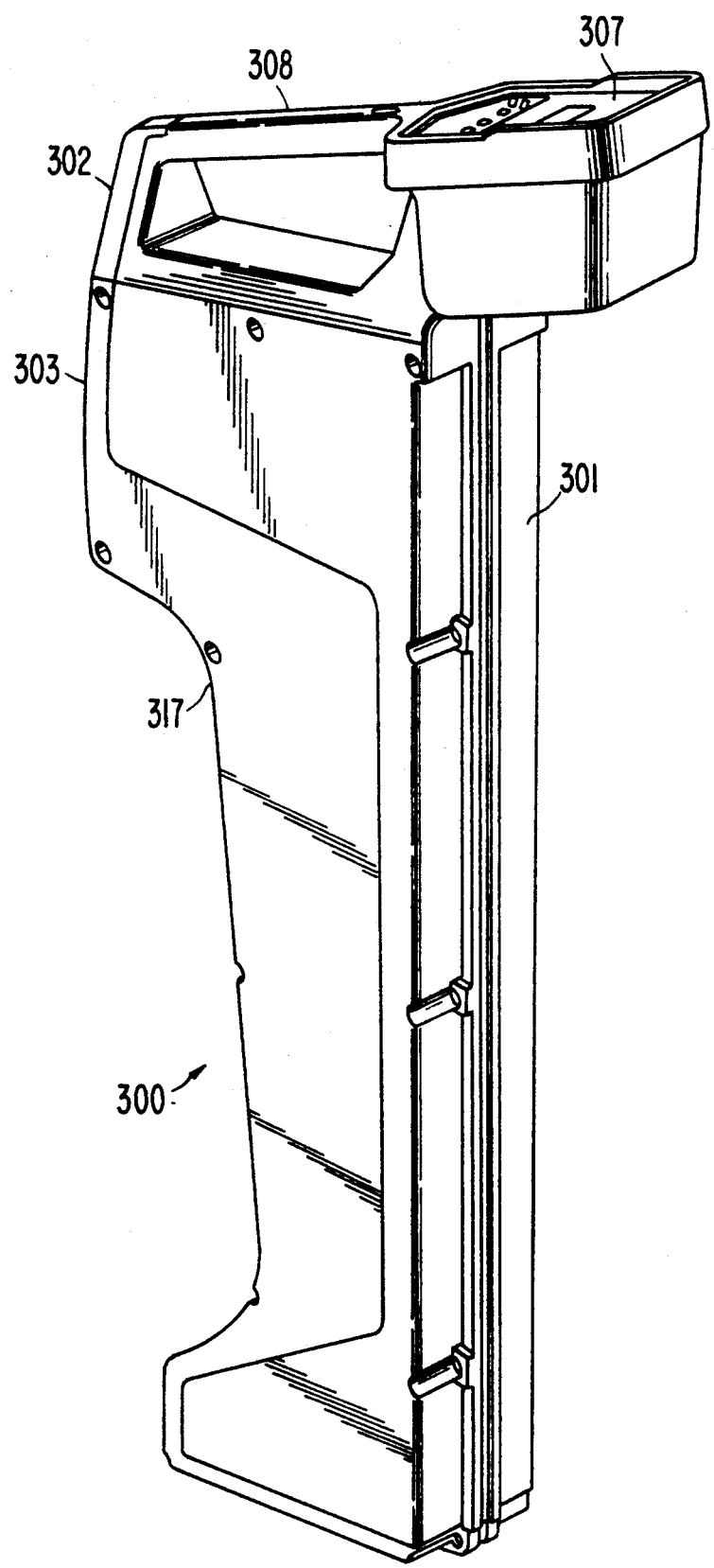
FIG. 11 is a perspective view of a receiver in accordance with an embodiment of the present invention.

FIG. 10 is a schematic diagram of a circuit associated with the transmitting antenna of FIG. 6. In accordance with this feature of the invention, a digitally tuned tank circuit is utilized in the transmitting antenna. Transmitting antenna 201 includes a coil with one end grounded and three taps 2, 3, and 4. Tap 2 is the input to antenna 201, which is coupled to a power amplifier (not shown) through capacitor 217. Transient absorber 218 is coupled between Tap 2 and ground. Capacitors 204 and 207 are coupled between Tap 3 and a first electrode of triac optocouplers 203 and 206, respectively. A second electrode of triac optocouplers 203 and 206 is grounded. The respective cathodes of optocoupler LEDs 203 and 206 are coupled to pull-up resistors 202 and 205 and the respective anodes of optocouplers 203 and 206 are coupled to the outputs of inverters 219 and 220. Control signals TUNE0 and TUNE1 are coupled to the inputs of inverters 219 and 220. Capacitor 214 and resistor 215 are connected in series between tap 1 and tap 4, and bi-directional transient absorber 216 is also connected between tap 1 and tap 4.

Capacitors 210 and 213 are coupled between Tap 4 and a first electrode of triac optocouplers 209 and 212, respectively. A second electrode of triac optocouplers 209 and 212 is grounded. The respective cathodes of optocoupler LEDs 209 and 212 are coupled to pull-up resistors 208 and 211 and the respective anodes are coupled to the outputs of inverters 221 and 222. Control signals TUNE2 and TUNE3 are coupled to the inputs of inverters 221 and 222.

High efficiency in a transmitting antenna requires a high-Q tuned antenna circuit that resonates at the frequency being transmitted. Under these conditions the current in the antenna can be many times larger than the input current, with a corresponding increase in radiated magnetic field intensity.

When capacitors 204, 207, 210, and 213 are not connected in the circuit, the resonant frequency is determined by the inductance of coil 201 and the capacitance of capacitor 214. The Q is determined principally by the reactive components and the resistance of coil 201 and resistor 215. Resistor 215 is chosen to limit the maximum Q.

Ideally, the circuit would be designed to provide a very high Q at each frequency to be transmitted. However, the transmitter of this invention is capable of transmitting at many different frequencies. Thus, a smaller number of tuned frequencies are used, spaced to cover the frequency range with the designed bandwidth.

When a transmitting frequency is selected by the operator, micro-controller 71 determines which of the possible resonant frequencies is appropriate. If it is not the highest frequency (which is tuned by capacitor 214), one or more of the four control signals TUNE0, TUNE1, TUNE2, and TUNE3 are set high by the micro-controller. Thus, one or more additional capacitors are coupled in parallel with capacitor 214 in the tuned circuit. For instance, if signal TUNE3 is set high, the output of inverter 222 goes low and triac optocoupler 212 is switched ON. Capacitor 213 is then connected across capacitor 214 and coil 201. This lowers the resonant frequency of the tank circuit. Since capacitors 204 and 207 are coupled to tap 3 rather than tap 4, the value of capacitance required is increased.

Transient absorber 216 limits the voltage across the tank to prevent damage to the components thereof. Similarly, transient absorber 218 protects the power amplifier.

Thus, for a given battery current, the power of the radiated signal over a wide range of frequencies is increased. Thus, the distance at which lines can be traced is increased. The present invention also provides the benefit of entirely automatic tuning of the antenna circuit after the operator selects a frequency, eliminating any need for an operator to tune the transmitting antenna.

Figure 23A:
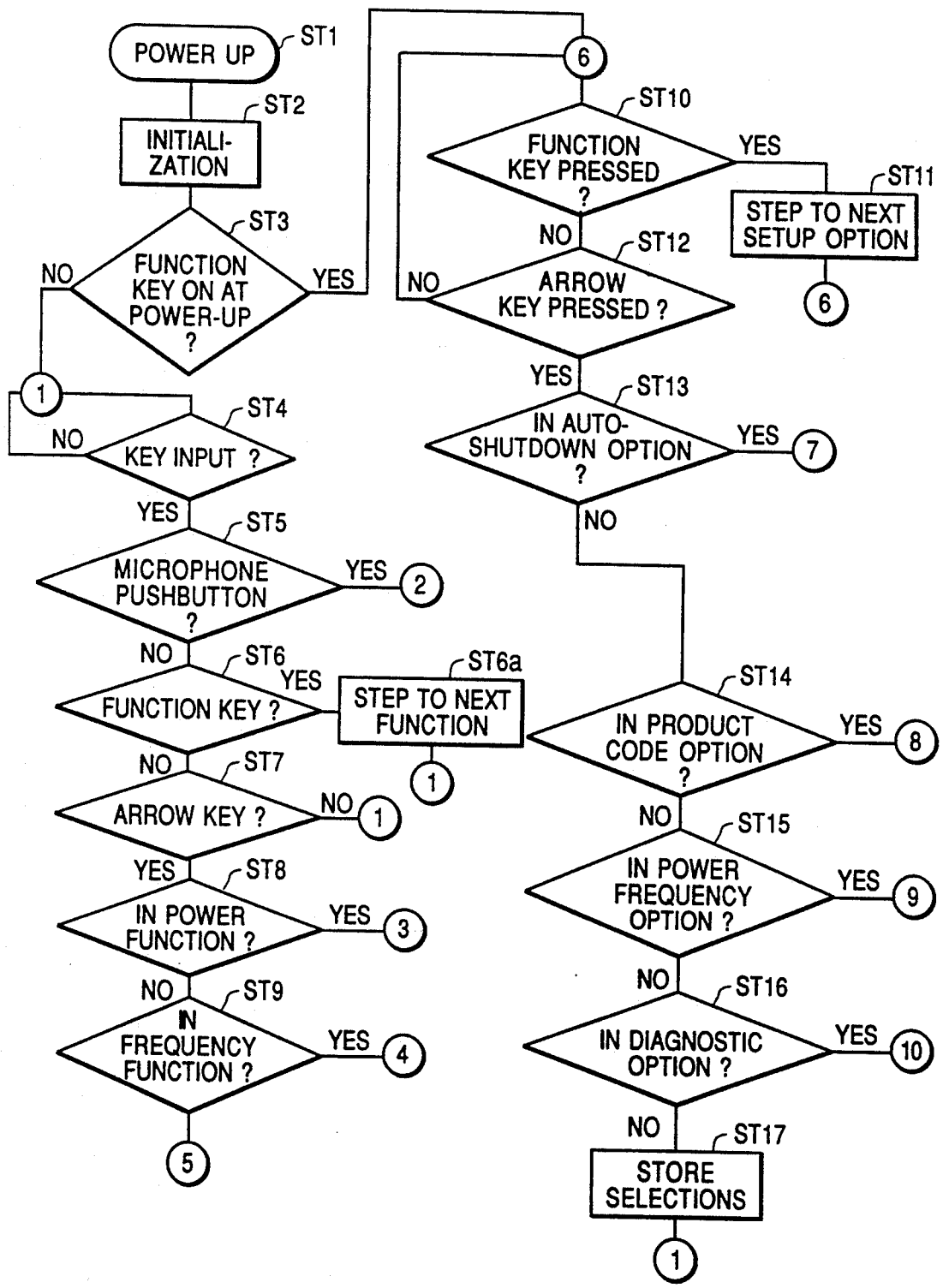
FIGS. 23(A)-23(C) are flow diagrams illustrating the operation of the transmitter of the present invention.
Figure 23B:
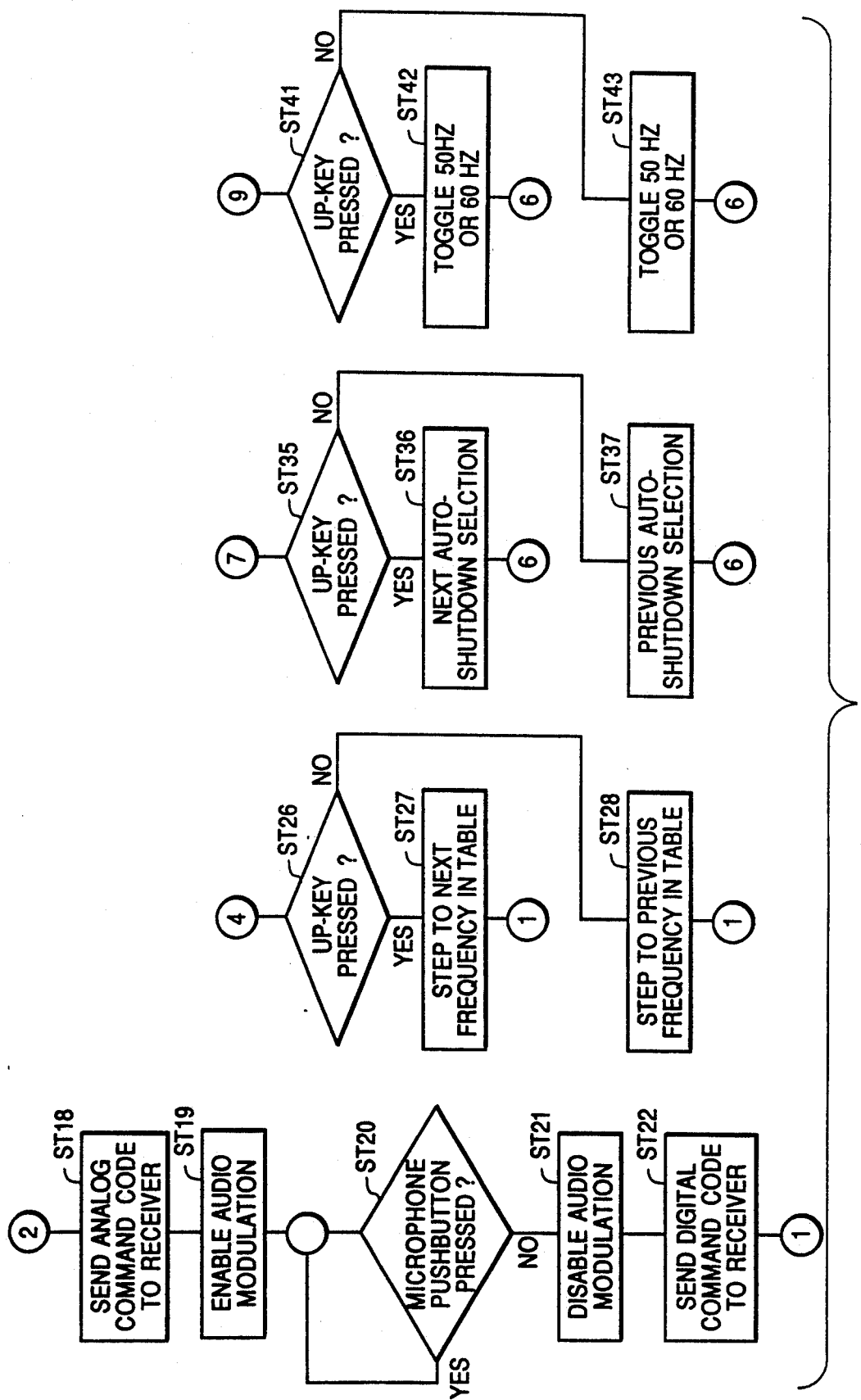
Figure 23C:
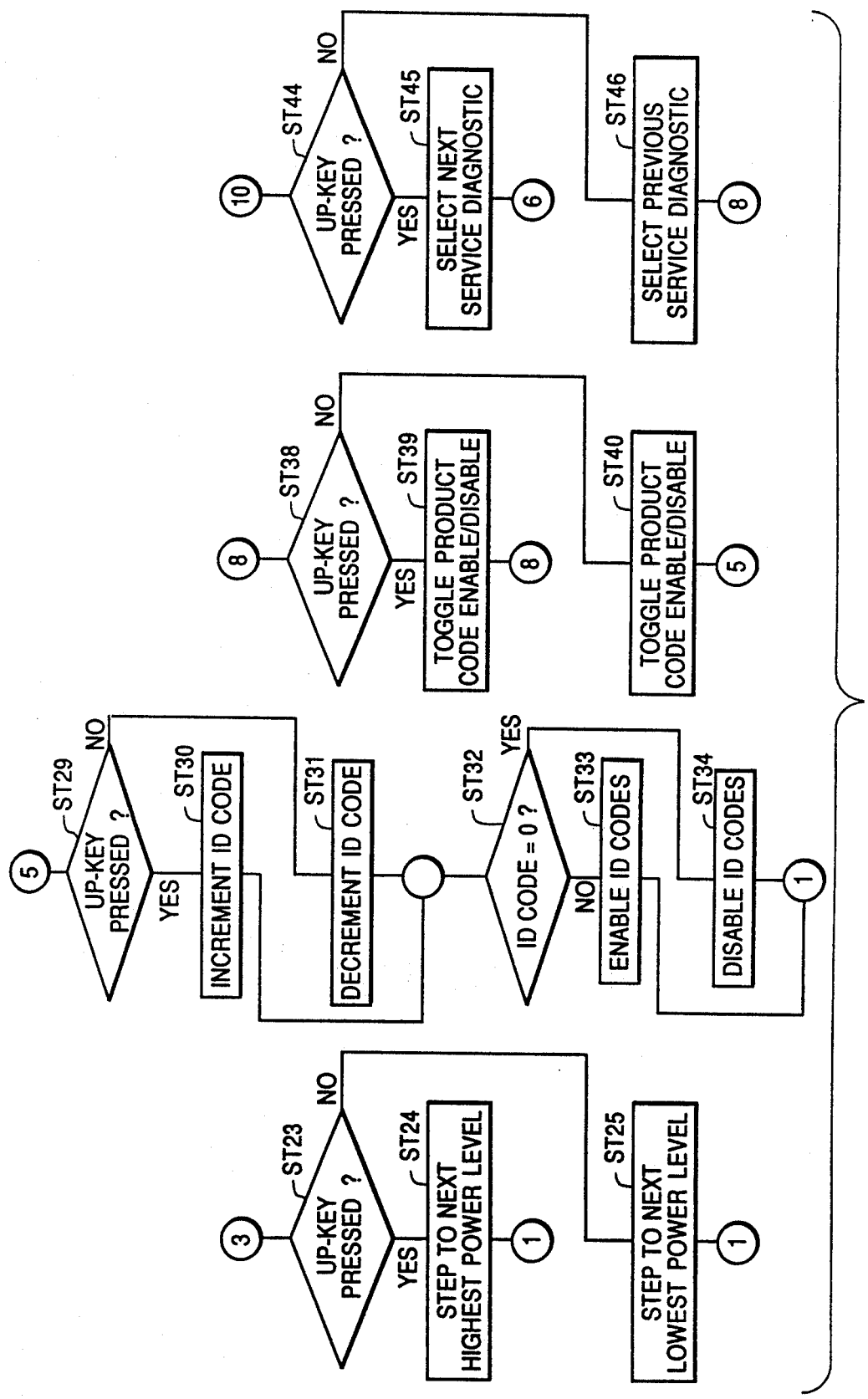

The transmitter operation will be explained with reference to the flowchart of FIGS. 23A-23C. After power is switched on (ST1) and the transmitter is initialized (ST2), a determination is made whether a function key is pressed at power-up (ST3). If so, control passes to ST10 (Set-up Mode). If not, a determination is made whether there is a key input (ST4). If a key is pressed, control passes to ST5 where a determination is made whether the microphone pushbutton is depressed. If so, control passes to ST18. At ST18, an analog command code is sent to the receiver and audio modulation is enabled at ST19. A determination is made at ST20 whether the microphone pushbutton is continued to be pressed. If so control remains at ST20. If not, control passes to ST21 where audio modulation is disabled and then the digital command code is sent to the receiver at ST22. Control then returns to ST4. If at ST5, the microphone pushbutton is not depressed, control passes to ST6.

At ST6, a determination is made whether the function key is pressed. If so, control passes to ST6a where the next function is stepped to. Control then returns to ST4. If the function key is not pressed at ST6, control passes to ST7 where a determination is made whether an arrow key is pressed. If not, control returns to ST4. If so, control passes to ST8 where a determination is made as to whether the transmitter is in power function. If so, control passes to ST23. A determination is made at ST23 whether the up key is pressed. If yes, the next higher power level is stepped to (ST24). If not, the next lowest power level is stepped to (ST25). In either case, control then returns to ST4. If at ST8, the transmitter is not in the power function, control passes to ST9.

At ST9, a determination is made whether the transmitter is in frequency function. If so, control passes to ST26 where a determination is made as to whether the up key is pressed. If so, the next frequency in the frequency table is stepped to (ST27). If not, the previous frequency is stepped to in the frequency table (ST28). In either case, control then returns to ST4.

If at ST9, the transmitter is not in frequency function, control passes to ST29 where a determination is made whether the up key is pressed. If so, the ID code is incremented (ST30). If not, the ID code is decremented (ST31). A determination is then made whether the ID code=0 (ST32). If not, ID codes are enabled (ST33). If not, ID codes are disabled (ST34). Control then returns to ST4.

If at ST3, the function key is pressed at power up, control passes to ST10. If the function key is pressed (ST10), the next set-up option is stepped to (ST11). If not, a determination is made whether the arrow key is pressed (ST12). If the arrow key is pressed, control passes to ST13. If not control returns to ST10.

At ST13, a determination is made whether the transmitter is in auto-shutdown option. If so, control passes to ST35 where a determination is made whether the up key is pressed. If so, the next auto-shutdown selection is stepped to (ST36). If not, the previous auto-shutdown selection is stepped to (ST37). Control then returns to ST10.

If the transmitter is not in auto-shutdown option, a determination is made whether the transmitter is in product code option. If so and the up key is pressed (ST38), product code enabled and disabled is toggled (ST39). If so and the up key is not pressed, product code enable/disable is toggled. Control then returns to ST10.

If the transmitter is not in product code option, a determination is made whether it is in power frequency option (ST15). If so and the up key is pressed (ST41), 50 Hz and 60 Hz are toggled (ST42). If so and the up key is not pressed, 50 Hz and 60 Hz are toggled (ST43). Control returns to ST10.

If the transmitter is not in the power frequency option, a determination is made whether it is in diagnostic option. If so and the up key is pressed (ST44), the next diagnostic is selected (ST45). If so and the up key is not pressed, the previous service diagnostic is selected (ST46). Control returns to ST10.

If the transmitter is not in diagnostic mode, the selections are stored and control returns to ST4.

Second Embodiment

In a second embodiment of the present invention, a locator transmitter has six outputs (as compared to the single output of the transmitter of the first embodiment) for coupling a signal to each of several lines that are to be traced. Each signal has a unique ID code to distinguish the signals from each other. A locator transmitter in accordance with the second embodiment is similar to the locator same transmitter housing, keypad, and LCD are utilized. However, the transmitter of the second embodiment includes six output jacks instead of one. Each transmitter output is identified by a unique ID code as described the above-identified Application entitled "An Improved System For Locating Multiple Concealed Underground Objects" (Ser. No. 539,616). Output No. 1 transmits ID code 1, output No. 2 transmits ID code 2, and so forth.

The six transmitter outputs can each be coupled to underground lines in one of two ways. Each output jack allows two types of accessory cables to be plugged therein. A first accessory cable is bifurcated and includes a clip on a first branch for direct coupling to a conductor and a clip on a second branch for coupling to a ground stake. A second accessory cable includes a toroidal clamp which can be disposed and secured around an outer surface of a conductor for inducing a signal without direct coupling. The second accessory cable also includes a ground clip for coupling to a ground stake.

Interrupt circuitry associated with the keypad and power control circuitry associated with the ON/OFF key are essentially identical to the corresponding circuitry shown in FIG. 8 and described above and the discussion will not be repeated here.

The four keys function to provide a consistent, user-friendly interface between the transmitter and the operator which is very similar to the interface described for the first embodiment. The markings on the keys are the same: ON/OFF, Fn, and two arrows: an up-arrow and a down-arrow. When the ON/OFF key is pressed to switch power ON, a Power-On Self-Test (POST) is automatically initiated, and then the previous configuration settings are restored. When the ON/OFF key is pressed again, the current configuration settings of the transmitter are saved in battery-back-up memory before power is actually switched OFF.

The Fn key and the Up-arrow and Down-arrow keys perform in the same manner as described above with respect to the first embodiment and will not be discussed here.

Transmitter Functions

The various functions available in the second embodiment are virtually identical to those described above with respect to the first embodiment and are described below for completeness only.

The first function sets the power level of the output signal for all six outputs. In this function, micro-controller 71 controls LCD 35 to display "PL:xx", where xx represents a numeric display of the power level. Ten power levels are available, the corresponding displayed numbers being 01 through 10. Preferably, the power levels are equally spaced although the invention is not limited in this respect. In the power level function, the Up-arrow and Down-arrow keys may be used to step through the power level settings. Actuation of the Up-arrow keys increments the power level and actuation of the Down-arrow key decrements the power level.

The second function is used for selecting the frequency of the output signal for all six outputs. In this function, micro-controller 71 controls LCD 35 to display "F-xx", where xx represents a numeric display of the approximate frequency in kilohertz. Preferably, four frequencies are available, the available frequencies depending on both the local power frequency (e.g. 50 Hz or 60 Hz) and on the nominal frequencies programmed in the firmware at the time of manufacture. In the frequency function, the Up-arrow and Down-arrow keys may be used to step through the available frequencies. Actuation of the Up-arrow key steps through the available frequencies in a pre-determined sequence and actuation of the Down-arrow key steps through them in the reverse sequence. The transmitter returns to the power level function when the Fn key is pressed after an arrow key is pressed.

Set-Up Mode

In addition to the above operating functions, there is a Setup Mode, which is entered by holding down the Fn key when the ON/OFF key is pressed. After the Setup Mode has been entered, pressing the Fn key steps through the following setup options.

The first setup option is auto-shutdown time. Auto-shutdown time is a predetermined length of time from when the last key was pressed after which the transmitter will switch itself OFF. If the transmitter switches itself OFF by auto-shutdown, the configuration settings are maintained in RAM of micro-controller 71. If, for example, the auto-shutdown time is sixty minutes, the transmitter will switch itself OFF sixty minutes after the last key is pressed. In this option, micro-controller 71 controls LCD 35 to display "AS:xx" where xx represents the auto-shutdown time in minutes. In a preferred embodiment, three selections are programmed including a selection for disabling auto-shutdown. In this option, the Up-arrow and the Down-arrow keys may be used to step through the programmed auto-shutdown times. Actuation of the Up-arrow key steps through the programmed selections in a predetermined sequence and actuation of the Down-arrow key steps through the selections in the reverse sequence. Preferably, the programmed times are: 60 minutes (LCD display "AS:60) which is the default selection; 30 minutes (LCD display "AS:30); and auto-shutdown disabled (LCD display "AS:d").

The second setup option is transmission of a product code. The transmitter can transmit a code on each output to inform a receiver of the type of transmitter that is sending the signal. This feature is discussed in the above-identified application entitled "An Improved System For Locating Concealed Underground Objects." A product code identifies a particular type of transmitter (e.g. a particular model of above-ground transmitter or a subsurface transmitter). A receiver in accordance with the invention of the above-identified application entitled "An Improved System For Locating Concealed Underground Objects" is capable of automatically and optimally configuring itself to operate compatibly with the particular type of transmitter. In this function, micro-controller 71 controls LCD 35 to display "PC:xx" where xx indicates whether the product code feature is enabled or disabled. The operator can toggle between two states using the Up-arrow key or Down-arrow key: product code disabled (LCD display "PC: d", default selection) and product code enabled (LCD display "PC:On").

The third setup option is local power frequency. As discussed in commonly assigned copending Application Ser. No. 07/539,851, the frequency of the carrier signal may be chosen to avoid harmonics of the local power frequency or local noise. In accordance with a preferred embodiment, two sets of four frequencies are stored. A first set of four frequencies is chosen for a local line frequency of 60 Hz and a second set of four frequencies is chosen for a local line frequency of 50 Hz. In this option, micro-controller 71 controls LCD 35 to display "LF:xx" where xx is the local line frequency in Hertz. In a preferred embodiment, the operator can toggle between the two states by using the Up-arrow key or the Down-arrow key: 60 Hz (LCD display "LF:60", default for U.S.A.) and 50 Hz (LCD display "LF:50 ").

The fourth setup option relates to service tests which are generally not for operator use. A service test may, for example, comprise repeated execution of the POST set. LCD 35 may be incremented for each completed execution. The test may stop when an error is detected and LCD 35 may display an error code. Service tests may also be implemented to debug hardware and software. The Up-arrow key steps through the tests in ascending numeric order and the Down-arrow key steps through the tests in descending order. In a preferred embodiment, there are five selections: no diagnostic (LCD display "Sd: d"); service diagnostic No. 1 (LCD display "Sd: 1"); service diagnostic No. 2 (LCD display "Sd: 2"); service diagnostic No. 3 (LCD display "Sd: 3"); and service diagnostic No. 4 (LCD display "Sd: 4"). The selected test is executed when the Fn key is pressed.

A fifth option in the Setup Mode relates to storing the selections and exiting the program (LCD display "End"). Pressing the Up-arrow key or Down-arrow key in this option stores the selected setup options in memory and exits to the Power Level function. If the Fn key is pressed again instead of one of the arrow keys, the instrument returns to the auto-shutdown time setup option.

When power is switched OFF (but the battery is not removed), all user determined settings and internal operational parameters are saved in memory. When the power is switched ON, the transmitter resumes operation utilizing exactly the same settings. When power is switched ON again, the transmitter performs a comprehensive self-test sequence to insure operational fitness.

Self-Integrity Tests

At appropriate times during normal operation, the transmitter performs Self-Integrity Tests (SIT) to ensure proper operation. In the event the SIT discovers a problem, the operator is notified by means of three audio beeps and the display of "Exxx" on the LCD. The first two numerical digits indicate the identity number of the software module which discovered the problem and the third digit is the particular error code. The operator must switch the unit OFF and then switch it back ON to clear the error condition and resume operation.

The audio beep signal is generated by micro-controller 71 for alerting the operator to special conditions. The transmitter sounds a single beep every 10 seconds to signal the operator that it is operative. The transmitter sounds two beeps upon satisfactory completion of the POST. The transmitter sounds three beeps whenever a SIT failure occurs.

POST

The POST tests for the second embodiment of the present invention are similar to those for the first embodiment.

Third Embodiment

In a third embodiment of the present invention, a locator transmitter has six outputs for coupling signals having a unique frequency to each of several lines that are to be traced. The transmitter of the third embodiment is virtually identical to the first and second embodiments of the present invention.

The six transmitter outputs can be coupled to underground lines in one of two ways. Each output jack allows two types of accessory cables to be plugged therein. A first accessory cable is bifurcated and includes a clip on a first branch for direct coupling to a conductor and a clip on a second branch for coupling to a ground stake. A second accessory cable includes a toroidal clamp which can be disposed and secured around an outer surface of a conductor for inducing a signal without direct coupling. The second accessory cable includes a ground clip which may be coupled to a ground stake.

Interrupt circuitry associated with the keypad and power control circuitry associated with the ON/OFF key are essentially identical to the corresponding circuitry shown in FIG. 8 and described above and the discussion will not be repeated here.

The four keys function to provide a consistent, user-friendly interface between the transmitter and the operator which is essentially identical to the interface described for the second embodiment.

Frequency selection appears the same to the operator as the frequency selection in the first and second embodiments. The LCD displays "F-:xx", where xx represents a numeric display of the approximate frequency in kilohertz. Four nominal frequencies are available. The six actual frequencies for the six outputs are selected automatically by the transmitter, as described in commonly assigned copending Application Ser. No. 539,616, entitled "An Improved System For Locating Multiple Concealed Underground Objects" and are closely grouped around the nominal frequency. The exact frequencies selected depend both on the local power frequency and on the nominal frequencies programmed in the firmware at the time of manufacture.

RECEIVER

Figure 14:
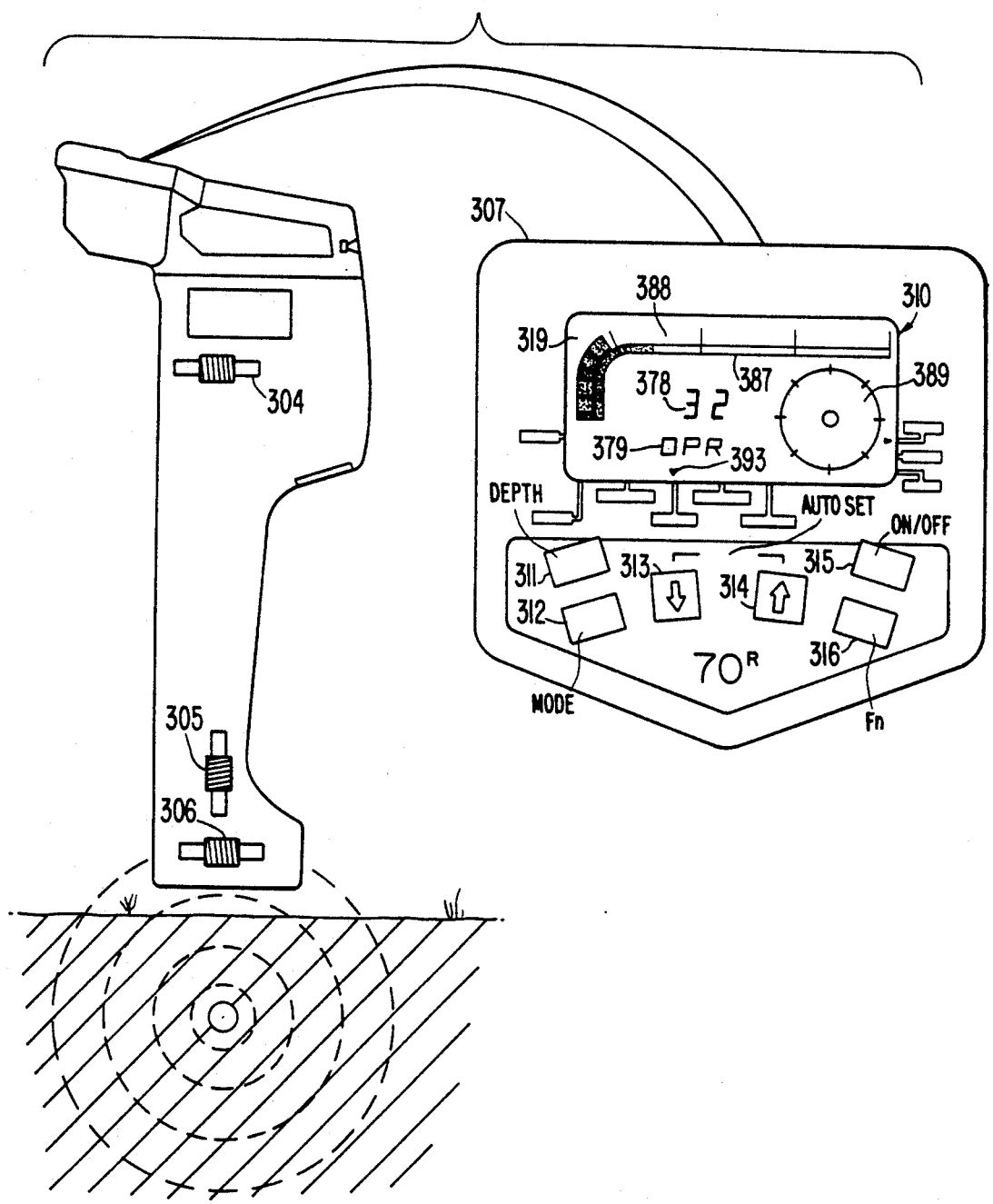
FIG. 14 is a side elevational view of a receiver illustrating the details of the receiver console.

A receiver in accordance with the present invention is illustrated in FIGS. 11–14. Receiver 300 includes a receiver housing 301. Receiver housing 301 comprises an upper housing portion 302 and a lower housing portion 303. Antennas 304, 305, and 306 are disposed within lower housing portion 303 as illustrated in FIG. 14. Antennas 304, 305, and 306 detect signals from underground sources such as underground lines or underground transmitters. As discussed in greater detail below, upper housing portion 302 and lower housing portion 303 may be selectively rotated relative to one another about a vertical axis to facilitate the orientation of antennas 304, 305, and 306 in accordance with the type of electromagnetic source being detected while affording comfort for an operator carrying the receiver.

Upper housing portion 302 includes a console 307 and a handle 308 for carrying the receiver. As illustrated, console 307 and handle 308 are preferably slightly angled upwardly away from the operator for comfort and enhanced viewing of the display. Handle 308 is preferably configured and dimensioned to accommodate a gloved hand. Console 307 includes a display 310 and control keys 311–316. Lower housing portion 303 includes a cut-out portion 317 which serves to reduce the wind resistance of the receiver. Cut-out portion 317 reduces the external surface area of the receiver and allows the operator to better orient the receiver on windy days and maintain the receiver in the proper position. However, this reduced wind resistance does not compromise the structural strength of the receiver.

FIG. 14 illustrates in greater detail the console 307 of the receiver of the present invention. Control keys 311–316 control all functions and operation of the receiver. This provides enhanced control for an operator since receiver 300 is entirely controllable by the thumb of the hand that is holding or carrying receiver 300. Preferably, raised outlines are embossed on the control keys so the control keys may be identified by touch. Keys 311–316 also preferably activate snap-action switches to provide tactile feedback to an operator. Console 307 also includes a liquid crystal display (LCD) 319 which displays the various receiver modes and settings, as well as other indicia such as signal strength.

Swivel Joint

Figure 15:
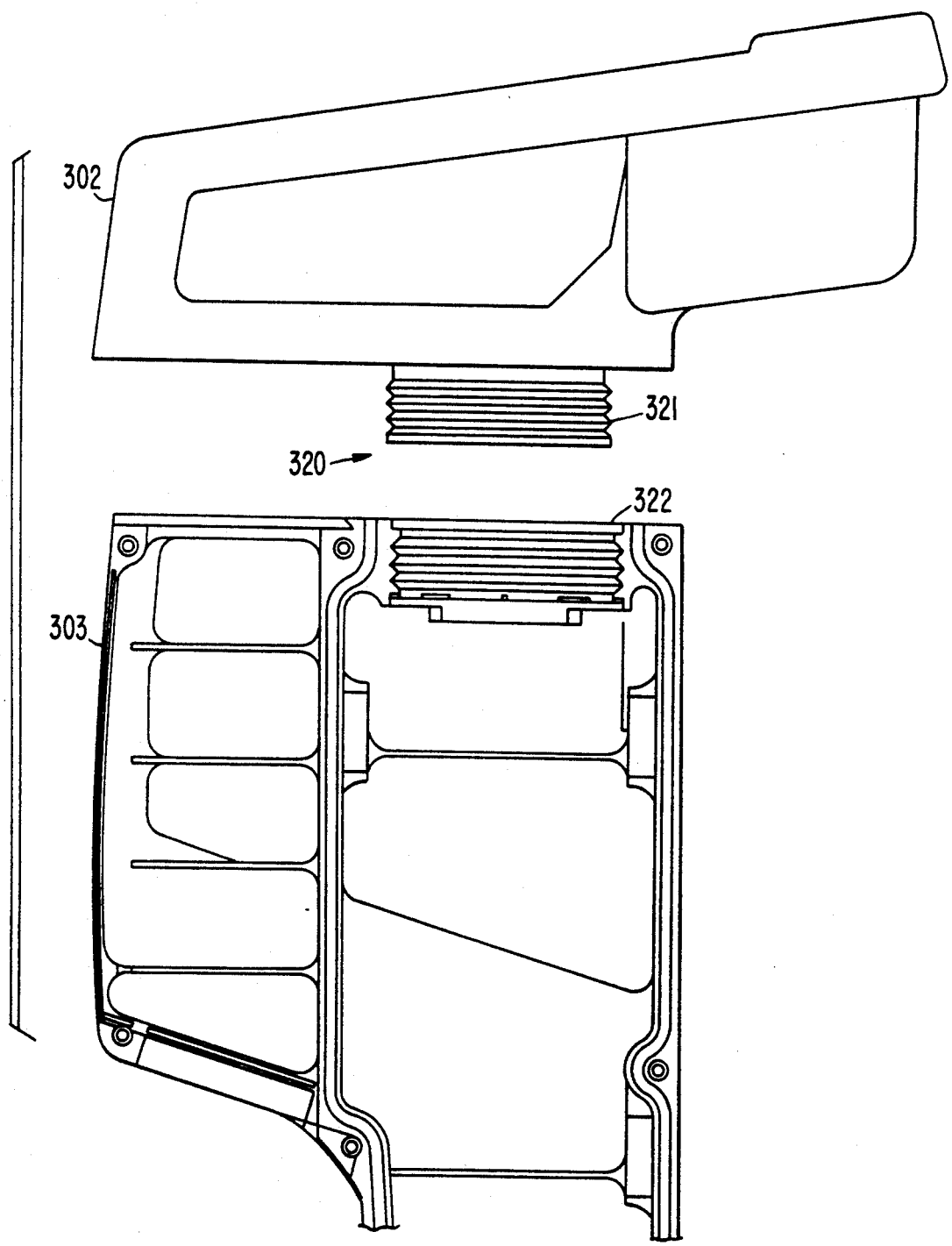
FIG. 15 is a side exploded view of a swivel joint of the receiver of FIG. 11.

As noted above, upper housing portion 302 is coupled to lower housing portion 303 so as to permit relative rotation of these portions in order to promote convenient orientation of the antennas. In a preferred embodiment, this is accomplished by the provision of a swivel joint. Swivel joint 320 in accordance with the present invention is illustrated in FIG. 15. The swivel joint overcomes the problem of an operator having to hold the receiver in an awkward position in at least operating mode if the receiver is designed to trace both underground lines and underground moles having transmitters mounted therein. The magnetic field generated by an underground conductor is radial and unipolar. However, the magnetic field generated by an underground transmitter is axial and bipolar. The swivel joint of the present invention overcomes the difficulty associated with orienting the antennas of the receiver to properly detect signals from each of these underground sources.

Figure 12:
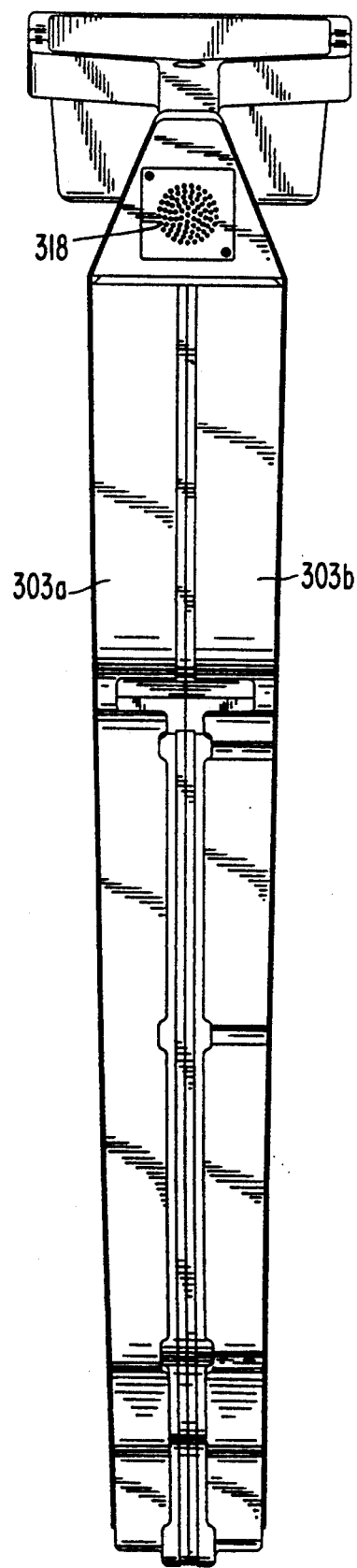
FIG. 12 is a rear view of the receiver of FIG. 11.
Figure 16:
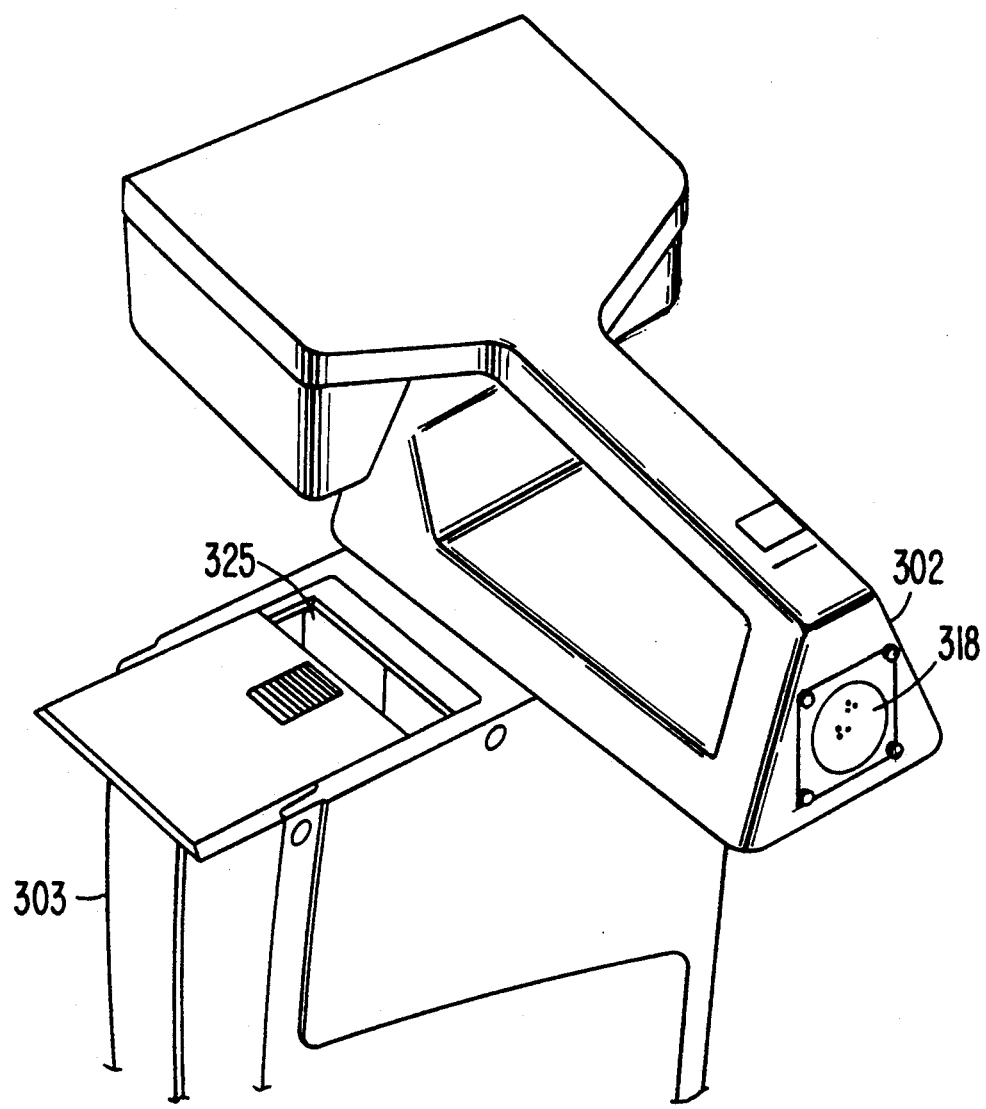
FIG. 16 is a perspective view illustrating the rotation of the upper housing portion of the receiver relative to the lower housing portion.

Upper housing portion 302 and lower housing portion 303 are provided with respective corresponding mating portions 321 and 322. Although the configuration of these corresponding mating portions have the appearance of being threads, corresponding mating portions 321 and 322 have no pitch or lead. As best shown in FIG. 12, lower housing portion 303 includes two sections 303a and 303b which are secured when assembled to form portion 303. Sections 303a and 303b are assembled such that the two halves of mating portion 322 entrap or surround mating portion 321. A friction fit between mating portions fit 321 and 322 is preferably provided to aid in maintaining the relative position of upper housing portion 302 to lower housing portion 303 when these portions are rotated relative to each other. As illustrated in FIG. 16, the rotation of the lower housing portion relative to the upper housing allows access to a battery compartment 325. Preferably, the rotation is limited to ±90° to accommodate either a right or left-handed operator without undue stress on the interconnecting internal wiring of the upper and lower housing portions. Any amount of rotation within this range may be effected to suit the hand/arm comfort of the operator. The principle purpose of this feature is to orient the receiver coils (antenna) properly with respect to a line being traced while simultaneously permitting an operator to hold the receiver in comfortable position.

The feel of the receiver of the invention is one of balance and easy movement. The main reason is that the center of gravity is directly under the handle and high, close to the handle, making it easy to swing and turn the wand. This is achieved by mounting the battery as high as possible and locating the components for proper balance. The cut-out shape of the wand also contributes to the feel by making it easy to move the wand through the air.

The controls of the receiver as illustrated in FIG. 14 are convenient for one-handed operation since six keys 311-316 control all functions of the receiver. The location, size and shape of these keys are designed for operation by the thumb of the hand that is holding receiver 300. The operator is informed about the various receiver modes and settings, as well as the signal strength, through the liquid-crystal display (LCD) 310.

Speaker 318 and LCD 319 provide information to an operator regarding the status of receiver 300. As shown in FIG. 14 LCD 319 includes numeric display 378 having four seven segment numeric characters 380-383 for displaying various numeric qualities such as signal strength, frequency, and error codes. LCD 319 further includes alphanumeric display 379 having three alphanumeric characters 384-386 for displaying messages to the operator. Multi-segment bar graphs 387 and 388 graphically display information such as gain setting and signal strength. A roll angle of an underground boring tool, as discussed in greater detail in commonly assigned copending application Ser. Nos. 539,699, abandoned, and 539,551, now U.S. Pat. No. 5,133,417, entitled "Angle Sensor For A Steerable Boring Tool" and "Angle Sensor Using Thermal Conductivity For A Steerable Boring Tool", both of which are incorporated herein by reference, may be displayed on compass rose 389. The direction to a signal source may also be displayed on compass rose 389. The various operating and non-operating states of receiver 200.

The six keys 100-105 function to provide a consistent, user-friendly interface between the receiver and the operator. The ON/OFF key 301 does not merely switch power ON and OFF, but initiates software functions both when pressed to switch power ON and when pressed to switch power OFF. When ON/OFF key 311 is pressed to switch power ON, a Power-ON Self Test, described in greater detail below, is automatically initiated. When ON/OFF key 311 is pressed again, the current configuration settings of the receiver are saved as described below before power is actually switched OFF.

Mode key 312 sequentially steps through the six modes of the receiver. These comprise five operating modes—Power Mode, Active Mode, Beacon Mode, Radio-Wide Band Mode, and Radio-Narrow Band Mode—and a Setup Mode. As noted above, a triangular pointer is illuminated on display 319 to inform an operator which mode the receiver is currently in. With reference to FIG. 14, triangular pointer 393 informs the operator that the receiver is in Power Mode.

Function key 316 sequentially steps through various functions in the selected mode. These functions are not identical from mode to mode, but certain of them are the same for all operating modes. These include the Operating Function, which is always selected when a new operating mode is entered, the Antenna Function, which allows selection of an antenna configuration, and the Volume Function, which allows adjustment of speaker volume.

Up-arrow key 314 and Down-arrow key 313 are used to step through selections within functions and raise and lower adjustments such as receiver gain and speaker volume.

Depth key 311 is used for measuring the depth of underground conductors or transmitters, and also for certain special functions.

Figure 17:
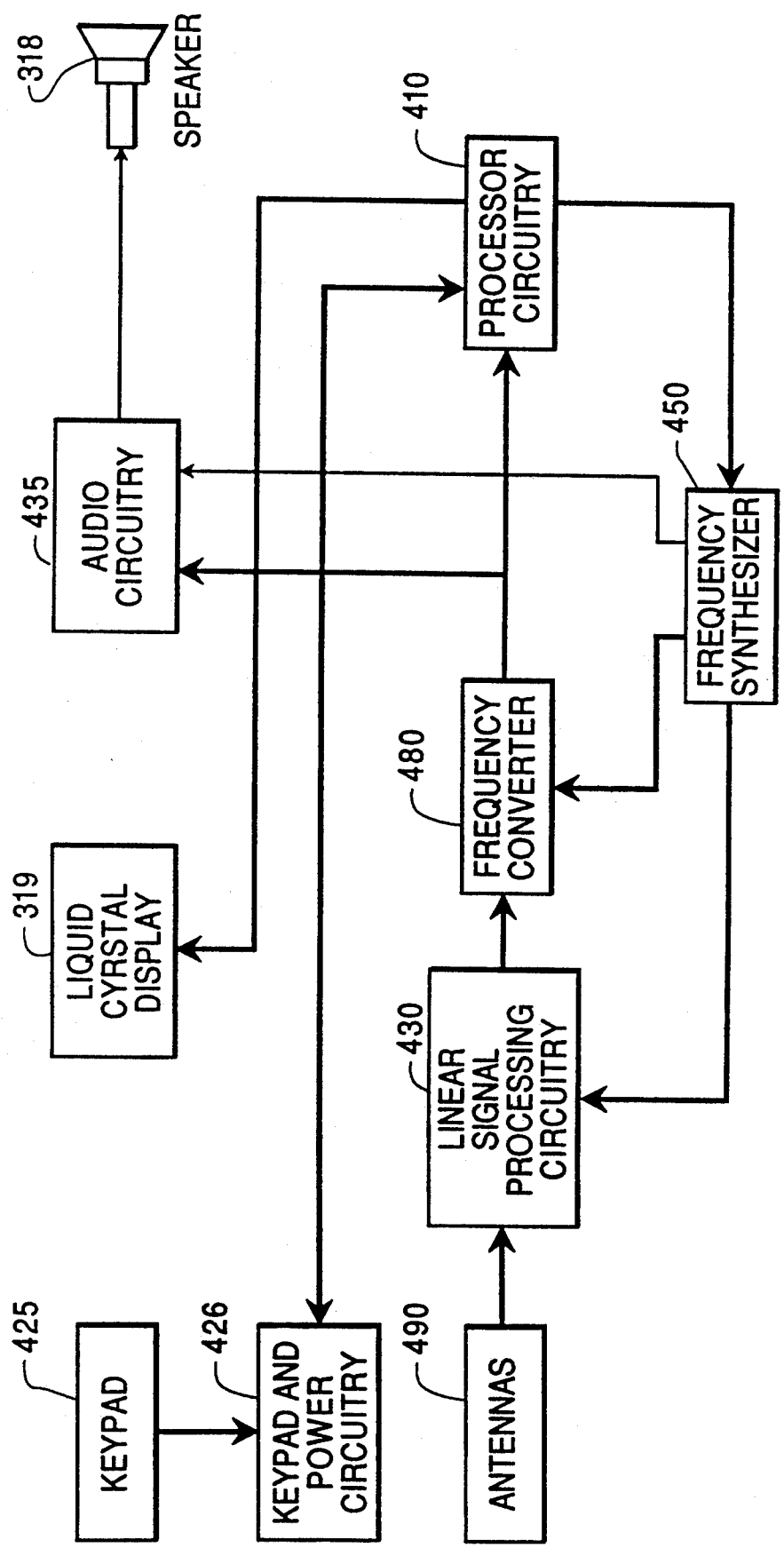
FIG. 17 is a block diagram of illustrating the components of a receiver in accordance with the present invention.

FIG. 17 is an electrical block diagram of the circuitry of receiver 300. Processor circuitry 410 coordinates and controls all functions and operation of the receiver. The operator (not shown) of receiver 300 supplies commands or instructions to the receiver using keypad 425. Keypad and power circuitry 426 interfaces between the keypad and the processor circuitry and switches receiver power ON and OFF. Receiver 300 provides information to the operator through liquid-crystal display 319 and speaker 318. Alternatively, audio information may be provided to the operator through earphones. Audio circuitry 435 generates signals for speaker 318 and controls the volume of the speaker. The magnetic component of the radiated electromagnetic field is detected by antennas 490. The detected signal is amplified and filtered by linear signal processing circuitry 430 and down-converted to an intermediate frequency by frequency converter 480. Frequency synthesizer 450 generates various frequencies needed for down-conversion and for tuning the various filters.

Figure 18:
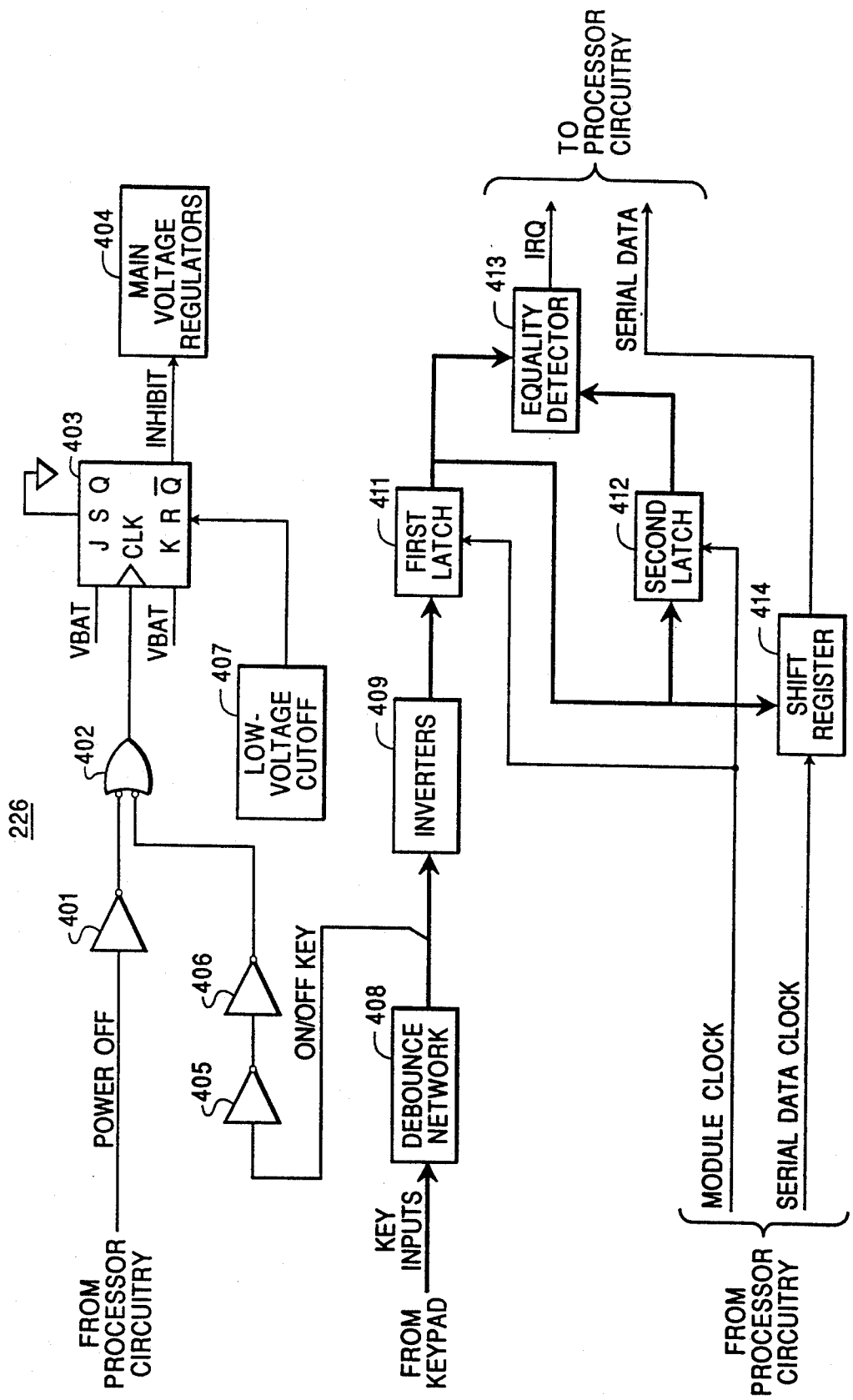
FIG. 18 is a block schematic diagram illustrating the details of keypad and power circuitry 426 in FIG. 17.

FIG. 18 is a block diagram illustrating the details of keypad and power circuitry in FIG. 17. Individual lines from each of the keys of keypad 425 in FIG. 12 are coupled to de-bounce network 408. Debounce network 408 includes pull-up resistors and RC integrators. The output lines from debounce network 408, with the exception of the line originating with the ON/OFF key, go to 74HC14-type Schmitt trigger inverters 409. The output lines from inverters 409 go to 74HC174-type first latch 411. On the positive transition of the module clock signal, the states of the output lines from inverters 409 are latched in first latch 411. At the same time, the previous states of first latch 411 are latched in 74HC174-type second latch 412. The contents of both first latch 411 and second latch 412 are supplied to 74HC688-type equality detector 413. If the states of first latch 411 and second latch 412 are not identical, equality detector 413 sends an interrupt request to processor circuitry 410 in FIG. 12. The states of first latch 411 are also supplied to the parallel inputs of 74HC165-type parallel-in/serial-out shift register 414. When the processor circuitry sends serial data clock pulses to shift register 414, the states of first latch 411 are clocked out as serial data and are supplied to the serial peripheral interface of the processor circuitry.

The line from the ON/OFF key is coupled through inverters 405 and 406 to low-active OR-gate 402. The output of OR-gate 402 is supplied to J-K flip-flop 403. Flip-flop 403 is wired so that it toggles on each positive transition of its clock input, alternately inhibiting and enabling main voltage regulators 404. Another voltage regulator (not shown) runs at all times, maintaining data in the internal RAM of the micro-controller (not shown).

To prevent the battery from being completely discharged, TLC77011-type low-voltage cut-off 407 resets flip-flop 403 if the voltage drops below a predetermined value. This shuts off power to everything except the static CMOS components associated with the ON/OFF key, which draw very little current, and the voltage regulator for the internal RAM of the micro-controller.

Figure 19A:
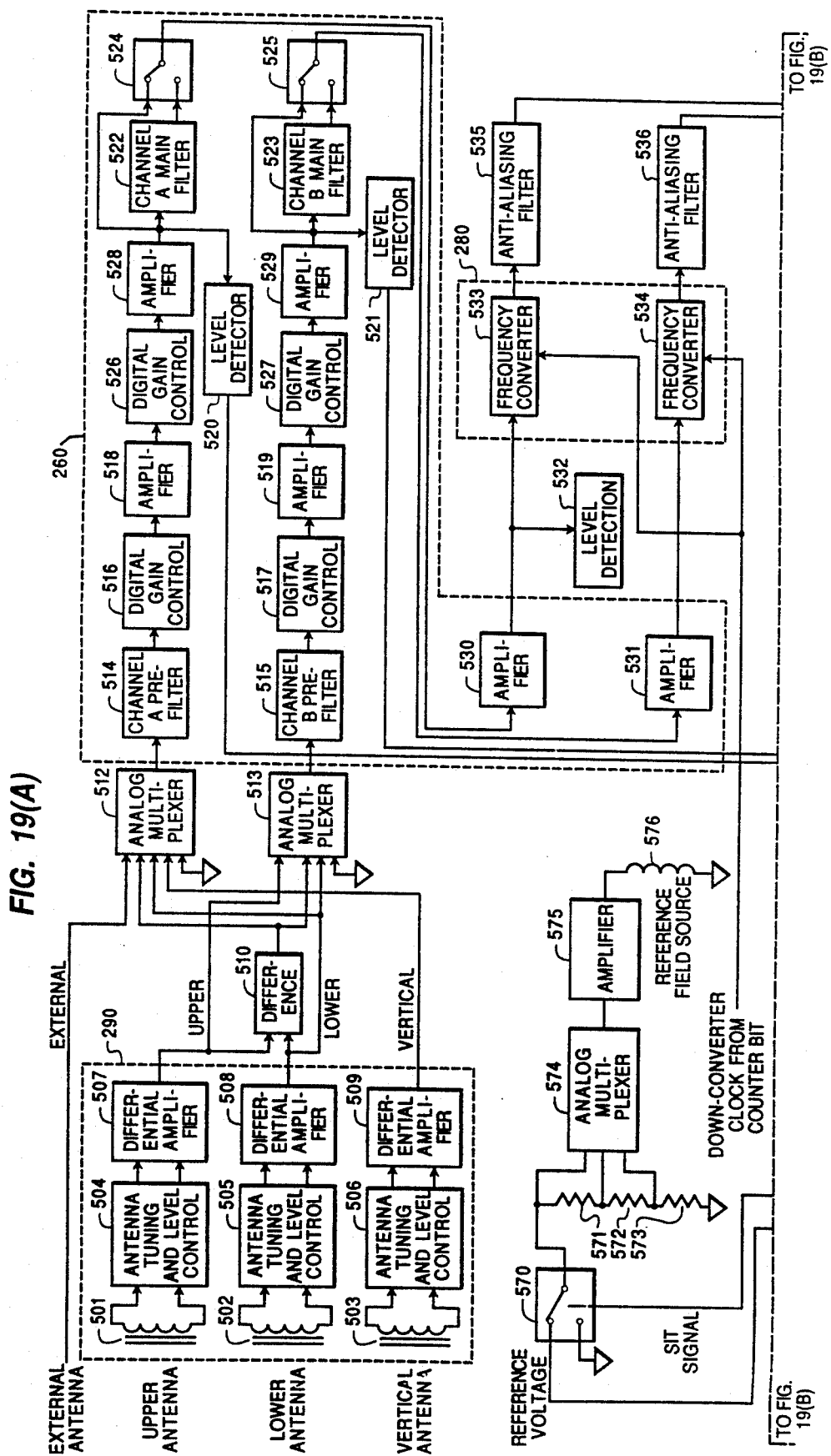
FIGS. 19A and 19B are block diagrams showing details of linear signal processing circuitry 200 in FIG. 17.

Referring to FIG. 19A, the magnetic component of the electromagnetic field radiated from an underground line (generated by transmitter 100) in accordance with the present invention is detected by antennas 501-503 in antenna circuit 290. The detected signals from antenna circuit 290 are then amplified and filtered within linear signal processor circuit 260. The filtered output signal from linear signal processor circuit 260 is then down-converted to an intermediate frequency (IF) signal by frequency converter 280. Frequency synthesizer 250 provides the signals utilized for the down-conversion process in converter 280 and also for tuning the various filters in processor circuit 260.

Referring again to FIG. 19A, antennas 501, 502 and 503 are essentially identical in design, but the connections of antenna 501 are reversed with respect to the connections of antenna 502 so as to produce a signal from antenna 501 which is out of phase with the signal from antenna 502 (assuming a common mode magnetic field for both antennas). The signal response of each antenna is tuned or attenuated by respective antenna tuning and level control circuits 504, 505 and 506. The balanced outputs of antenna circuits 504, 505 and 506 are then coupled to the inputs of high gain differential amplifier circuits 507, 508 and 509, respectively. Differential amplifiers 507, 508 and 509 each comprise a combination of MC33078 and MC33172 types operational amplifiers. The signals at the single-ended outputs of differential amplifiers 507, 508 and 509 are labeled UPPER, LOWER and VERTICAL, respectively. The UPPER and LOWER signals from differential amplifiers 507 and 508 are coupled to amplifier 510, which comprises an MC33172 type operational amplifier. Amplifier 510 algebraically combines the UPPER and LOWER signals to produce the sum of their signals. Since the UPPER and LOWER signals are 180 degrees out of phase, the summing operation actually provides a difference signal, labeled DIFFERENCE.

There are two channels in the signal processing circuitry, Channel A and Channel B, with similar circuitry in each. The signals UPPER and LOWER from differential amplifiers 507 and 508, DIFFERENCE from amplifier 510, and VERTICAL from differential amplifier 509 are coupled to the inputs of multiplexers 512 and 513, which comprise 4051 type 8-channel analog multiplexers. Each multiplexer 512 and 513 provides one output signal which is selected from the plurality of input signals by microcontroller 550, as will be explained further below. The output signal from multiplexer 512 is coupled to the first stage of signal processing channel A, while the output signal from multiplexer 513 is coupled to channel B. The selected signals for channels A and B are coupled to pre-filters 514 and 515, each of which comprises two sections of an MC33172 type dual operational amplifier. The resulting filtered signals are then coupled to digital gain controls 516 and 517, respectively. Each of digital gain controls 516 and 517 comprises one section of a TLC7528 type multiplying D/A converter. The outputs of digital gain controls 516 and 517 are coupled to respective amplifiers 518 and 519, which comprise MC33172 type operational amplifiers. The outputs of amplifiers 518 and 519 are coupled to digital gain controls 526 and 527, respectively, each of which comprises one section of a TLC7528 multiplying D/A converter. The outputs of digital gain controls 526 and 527 are coupled to respective amplifiers 528 and 529, which comprise MC33172 type operational amplifiers. The outputs of amplifiers 528 and 529 are connected to level detectors 520 and 521, respectively. Level detectors 520 and 521 allow microcontroller 550 to monitor the output signal levels of amplifiers 528 and 529, respectively. Level detectors 520 and 521 comprise passive components normally utilized in a conventional peak detector.

Main filters 522 and 523 comprise LMF100C type switched-capacitor filters including two bandpass sections connected in cascade. Switches 524 and 525 bypass or include a respective main filter 522 or 523. Each switch comprises one section of a 4053 type triple 2-channel analog multiplexer, which is separately controlled by microcontroller 550. A single control line (not shown) from microcontroller 550 switches the Q of both sections of filters 522 and 523 between two sets of predetermined values.

The outputs of switches 524 and 525 are coupled to respective amplifiers 530 and 531, each of which comprises both sections of an MC33172 type dual operational amplifier connected in cascade. Level detector 532, which comprises one section of an LM393 type comparator, is connected to the output of amplifier 530 in channel A. Level detector 532 outputs a logic signal to microcontroller 550 that goes low when the signal in Channel A exceeds a predetermined threshold.

The outputs of amplifiers 530 and 531 are coupled to respective frequency converters 533 and 534. Each frequency converter comprises an MC33172 type operational amplifier connected as an inverter and one section of a 4053 type triple 2-channel analog multiplexer, which switches between an inverted and un-inverted signal at a rate set by frequency synthesizer 250. The outputs of frequency converters 533 and 534 are coupled to respective anti-aliasing filters 535 and 536. Filters 535 and 536 comprise simple RC integrators whose time constants can be changed.

Figure 19B:
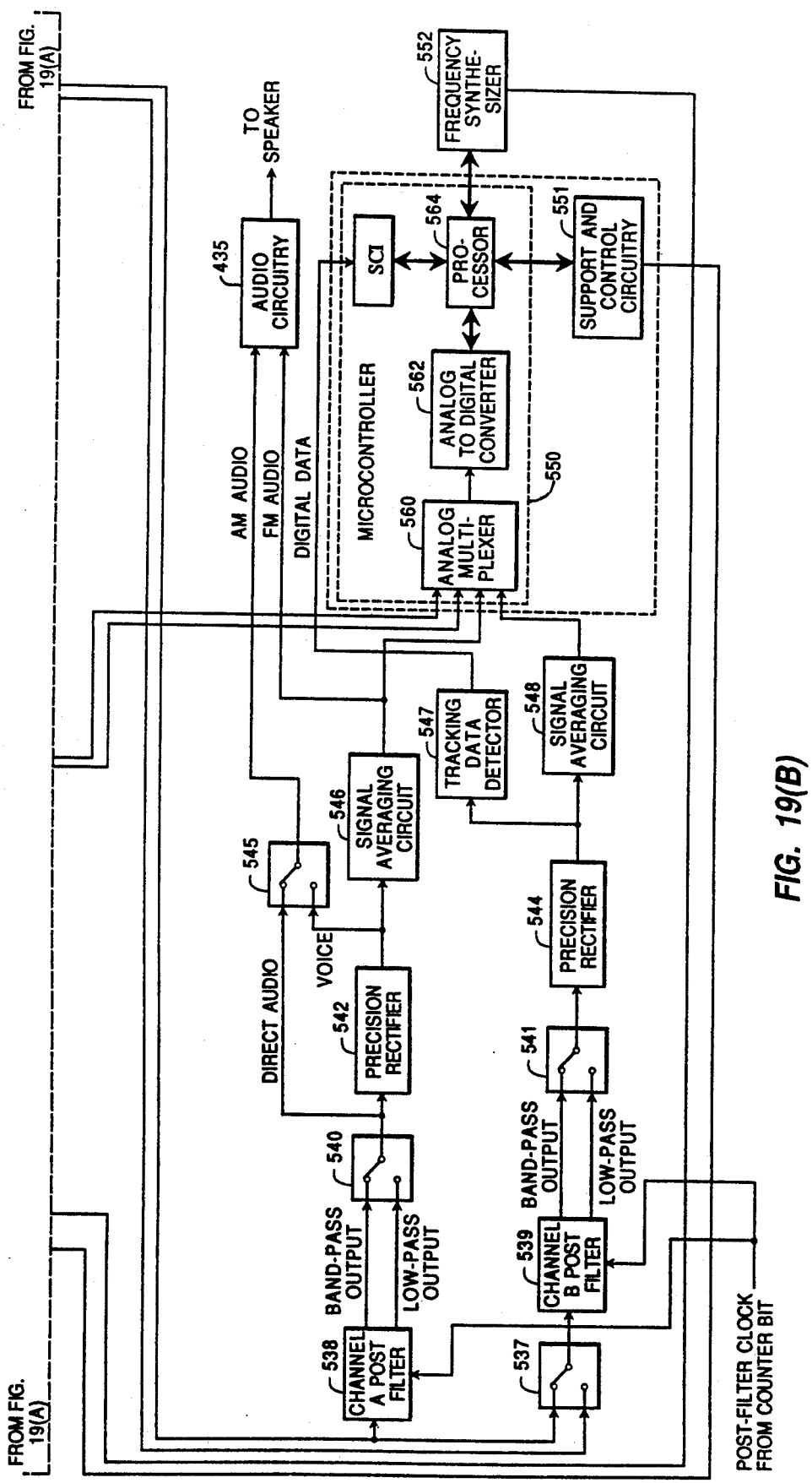

The output of filter 535 is coupled to post-filter 538 and one input of switch 537 shown in FIG. 19B. The output of filter 536 is coupled to the second input of switch 537. Switch 537 comprises one section of a 4053 type triple 2-channel analog multiplexer. Under the control of microcontroller 550, switch 537 couples either the channel A or channel B signal to post-filter 539. Post-filters 538 and 539 comprise MF5 type switched-capacitor filters that provide both a lowpass and bandpass output. The dual outputs from each of post-filters 538 and 539 are coupled to the dual inputs of switches 540 and 541, respectively. Each of switches 540 and 541 comprise one section of a 4053 type triple 2-channel analog multiplexer. Under the control of microcontroller 550, switches 540 and 541 select either the lowpass or bandpass output from respective post-filters 538 and 539. The control lines from microcontroller 550 that control switches 540 and 541 also control the separate Q of post-filters 538 and 539 by switching between two predetermined values of Q for each post-filter.

The respective outputs of switches 540 and 541 are coupled to precision rectifiers 542 and 544. Each precision rectifier comprises an MC33172 type dual amplifier, wherein one section is utilized as the primary rectifier and the second section buffers the output. The outputs of precision rectifiers 542 and 544 are coupled to respective signal averaging circuits 546 and 548, in which each signal averaging circuit comprises one section of an MC33172 type operational amplifier. The output of precision rectifier 542 is also connected to an input of switch 545.

The output of switch 540 is also coupled to the inputs of switch 545. Switch 545, which comprises one section of a 4053 type triple 2-channel analog multiplexer, selects either the output of switch 540 or the output of precision rectifier 542 to provide the AM audio signal. The input of digital data detector 547 is connected to the output of precision rectifier 544. The output from digital data detector 547 is coupled to the data input of the SCI of microcontroller 550.

Microcontroller 550 comprises a Motorola MC68HC11A8 type microcontroller, which includes an 8-channel analog multiplexer, an A/D converter, an asynchronous SCI, a synchronous SPI, and a timer system. Microcontroller 550 also includes electrically erasable and programmable memory (EEPROM) and RAM. Analog multiplexer 560 selects one of the output signals from level detectors 520 and 521, or from signal averaging circuits 546 and 548. The selected analog signal from analog multiplexer 560 is coupled to A/D converter 562, converted to a digital signal, and input to processor 564.

A precise reference voltage produced in support and control circuitry 551 goes to one input of switch 570, which is one section of a 4053 triple 2-channel analog multiplexer. The other input is grounded. The switch is controlled by signal SIT SIGNAL, which is generated in frequency synthesizer 552. The output of switch 570 is a square wave of precise amplitude, with a frequency that is a sub-multiple of 4 MHz as determined by the programming of a counter in frequency synthesizer 552. This square wave goes to a voltage divider composed of resistors 571, 572, and 573. Analog multiplexer 574 which is a 4053 triple 2-channel analog multiplexer with the sections interconnected, selects the full amplitude of the square wave or one of two lower amplitudes provided by the voltage divider as the input for amplifier 575 which is an MC33172. The amplifier output goes to coil 576, which radiates a low-amplitude electromagnetic field. This field can be detected by the antennas of the receiver, and is used to test receiver performance in one of the receiver's self-integrity tests.

Figure 20:
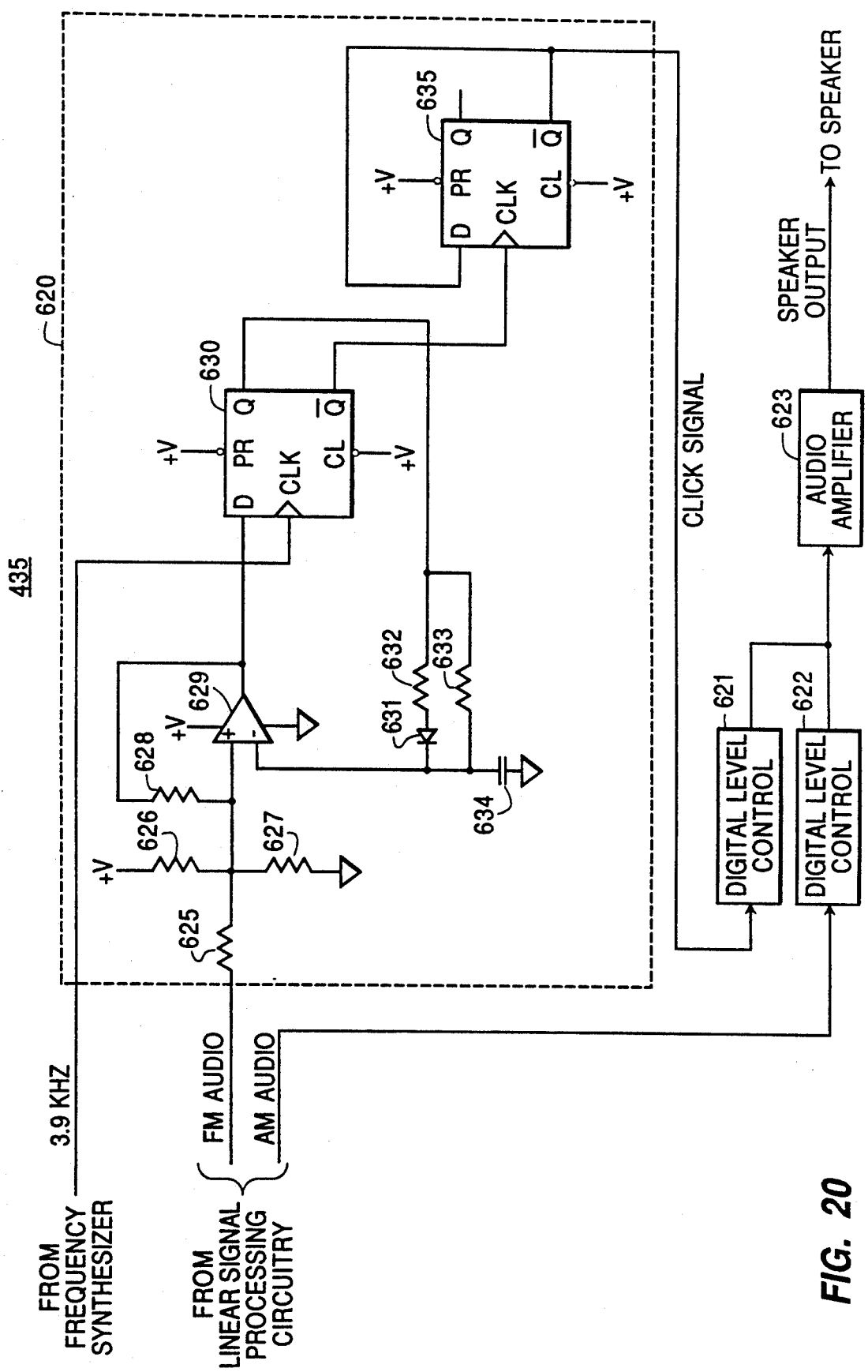
FIG. 20 is a block diagram showing details of audio circuitry 235 in FIG. 17.
Figure 22A:
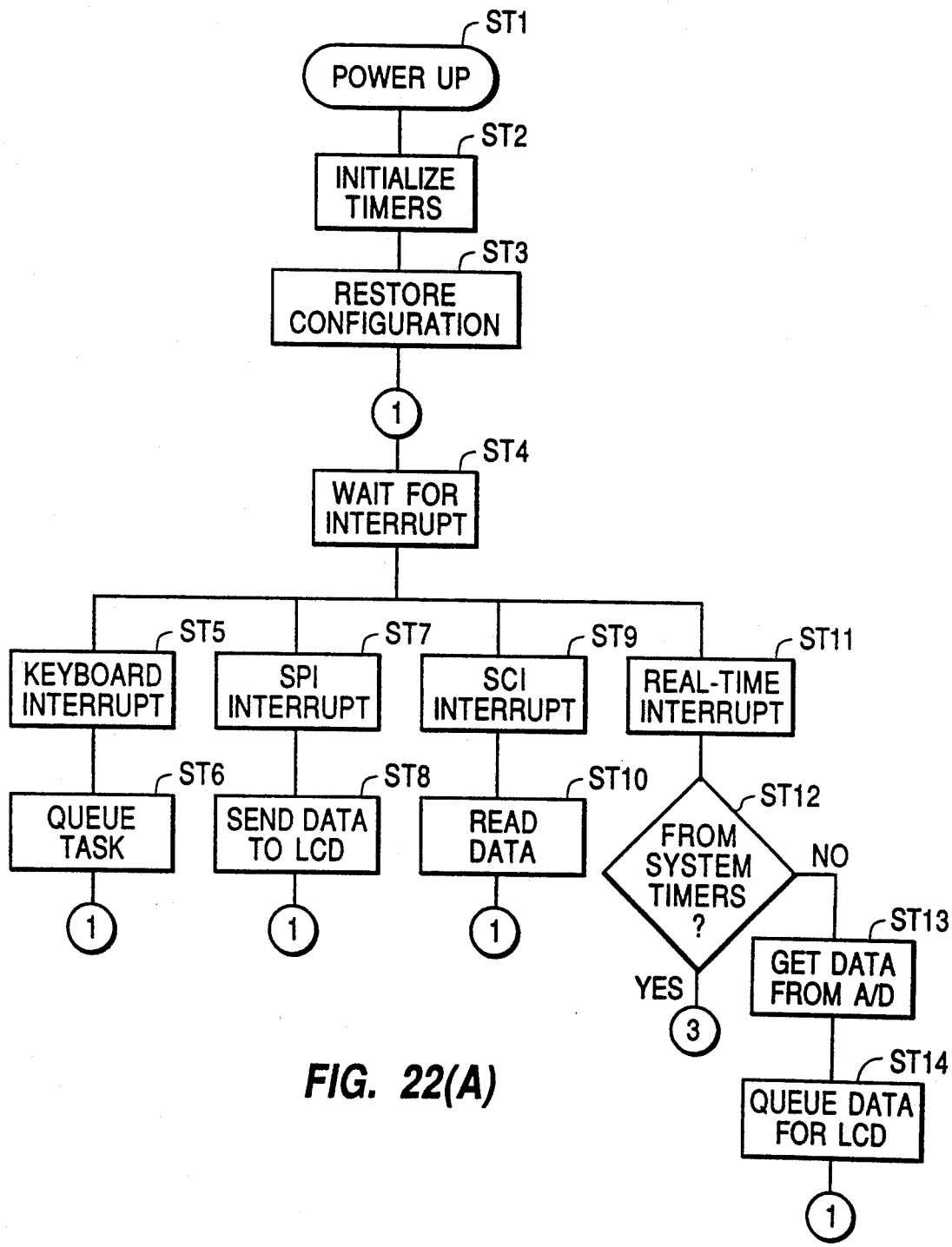
Figure 22B:
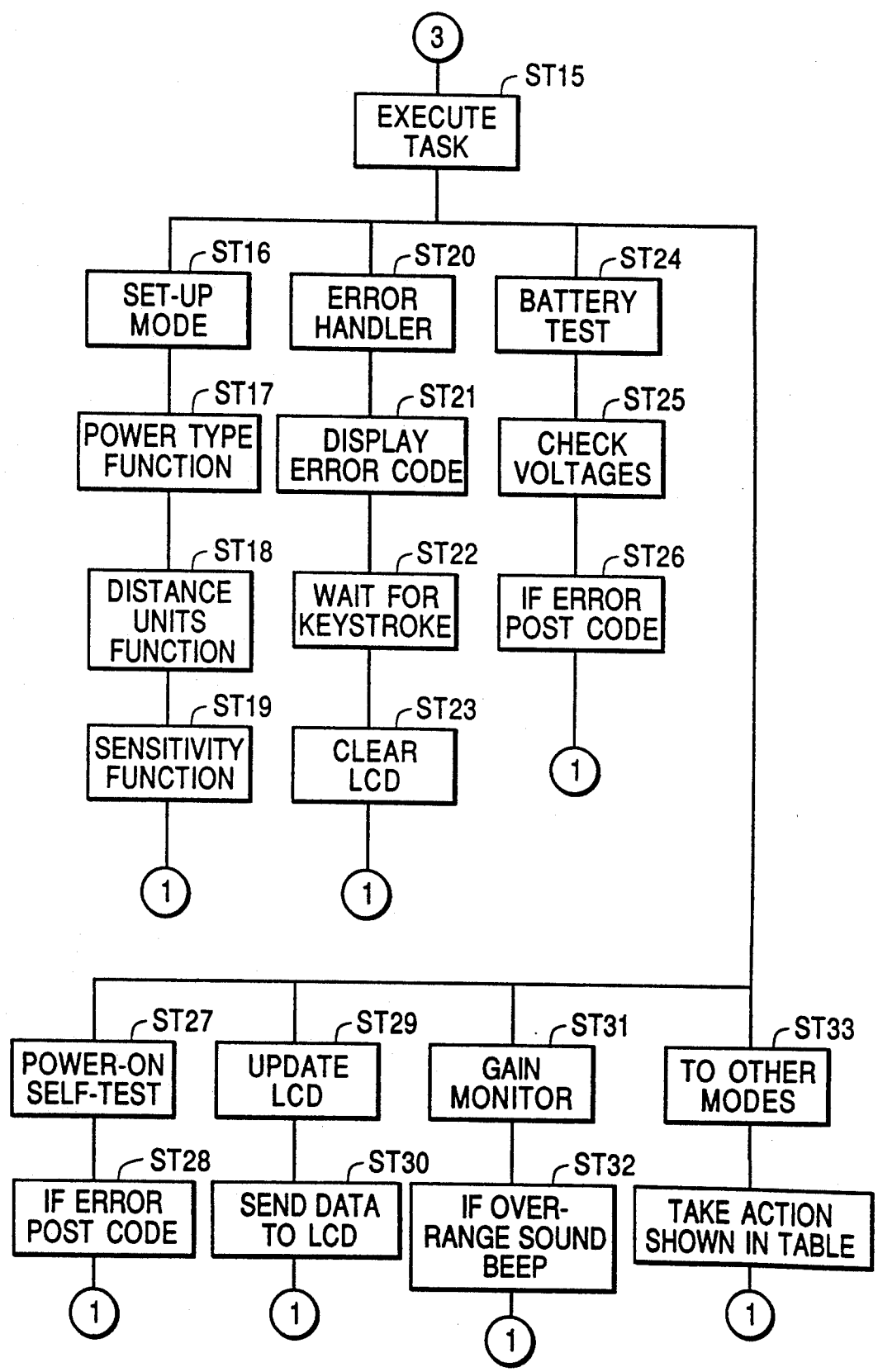

FIG. 20 is a block diagram showing details of audio circuitry 435 in FIG. 17. Signals AM AUDIO and FM AUDIO are inputs from the linear signal processing circuitry of FIG. 14. Clock signal 3.9 KHZ is an input from frequency synthesizer 250 of FIG. 12.

Signal FM AUDIO goes to click generator 620. The output of click generator 620, labelled CLICK SIGNAL in FIG. 15, goes to digital level control 621, which is one section of a TLC7528-type dual multiplying digital-to-analog converter. Signal AM AUDIO goes to digital level control 622, which is the second section of a TLC7528-type dual multiplying digital-to-analog converter. The outputs of digital level controls 621 and 622 are coupled together and go to MC34119-type audio amplifier 623. The output of amplifier 623 goes to speaker 240 in FIG. 12.

Digital level controls 621 and 622 are controlled by processor circuitry 210 in FIG. 12, using a data bus and addressing connections (not shown). A control line from processor circuitry 210 also enables or disables amplifier 623.

The FM AUDIO input to click generator 620 goes through resistor 625 to the non-inverting input of TLC27L2-type operational amplifier 629. Resistors 626 and 627 go from the non-inverting input of amplifier 629 to voltage+V and ground, respectively. The output of amplifier 629 goes to the D input of 74HC74-type flip-flop 630. Signal 3.9 KHZ, which comes from frequency synthesizer 250 in FIG. 12, goes to the clock input of flip-flop 630. The Q output of flip-flop 630 goes through the combination of diode 631 and resistors 632 and 633 to the inverting input of amplifier 629. Capacitor 634 goes from the inverting input of amplifier 629 to ground. The not-Q output of flip-flop 630 goes to the clock input of 74HC74-type flip-flop 635. The not-Q output of flip-flop 635 goes to the D input of flip-flop 635 and is also output CLICK SIGNAL.

Signal FM AUDIO is a voltage that rises with increasing signal strength. The output of click generator 620, CLICK SIGNAL, is a series of pulses that increase in frequency with an increase in signal FM AUDIO. The output of click generator 620 goes to the reference voltage input of digital level control 621, and modulates the output of level control 621. Processor circuitry 210 programs digital level control 621 to produce the desired output amplitude.

Signal AM AUDIO is an audio signal representing modulation on the received radio-frequency signal. If goes to the reference voltage input of digital level control 622, and modulates the output of level control 622. Processor circuitry 210 programs digital level control 622 to produce the desired output amplitude. The sum of the outputs of digital level controls 621 and 622 is amplified by audio amplifier 623. Either of the two digital level controls 621 and 622 may be programmed to produce no output, thus disabling the corresponding signal, or both types of signals may be amplified and go to speaker 240 simultaneously, as described below.

The operation of click generator 620 can be understood in terms of charging and discharging capacitor 634. If the non-inverting input of amplifier 629 is more positive than the inverting input, which is connected to capacitor 634, the output of amplifier 629 goes high. A small amount of hysteresis is provided by positive feedback through resistor 628. At the next positive transition of input signal 3.9 KHZ, the Q output of flip-flop 630 goes high. Capacitor 634 is charged through resistor 632 and diode 631, and the inverting input of amplifier 629 becomes more positive than the non-inverting input. The output of amplifier 629 goes low, and at the next positive transition of signal 3.9 KHZ the Q output of flip-flop 630 goes low. Resistor 633 is much larger in value than resistor 632, and diode 631 blocks current flow through resistor 632, so capacitor 634 discharges much more slowly than it charged. The length of time it takes to discharge to the point where the non-inverting input of amplifier 629 is again more positive than the inverting input depends on input level FM AUDIO. It will be seen that there is a minimum time between changes in the Q output of flip-flop 635, which is the period of signal 3.9 KHZ, but there is no maximum time. The asymmetric output of flip-flop 630 is converted to a square wave of half the frequency by flip-flop 635, which toggles on each positive transition of the not-Q output of flip-flop 630, producing output CLICK SIGNAL.

As discussed above, operators of prior art locators generally utilize the needle of a signal strength meter on the locator while walking to find the place of greatest signal strength by trial and error. Some prior art locators also have an operating mode in which the source is located by a null or minimum in signal strength. However, in these prior art devices, it is sometimes difficult to detect small differences in signal strength since merely moving the locator can cause needle movement. However, in accordance with the present invention, signal strength may be determined by changes in frequency of an audible signal supplied to the operator through, for example, earphones. This enables an operator to detect small differences in signal strength and thus more easily find where the signal is strongest or weakest.

Locating Modes of Operation

Receiver 200 provides three operating modes for locating or tracing concealed underground objects: a single antenna mode, a dual antenna mode, and a null mode. In the single antenna mode of operation, only (lower) horizontal antenna 502 (FIG. 8) is utilized to detect the radiated signal from the underground object to be traced. The signal from antenna 502 is processed through the channel A portion of receiver 200 and detected by a signal detector circuit comprised of precision rectifier 542 and signal averaging circuit 546. The output of this signal detector circuit combination is coupled through analog multiplexer 560 to A/D converter 562 and on to microcontroller 550. Microcontroller 550 scales the detected signal, transforms it to an appropriate signal for display, and provides the transformed signal to liquid-crystal display 230 (FIG. 4). An operator then traces the underground object by observing the displayed signal.

In the dual antenna locating mode, the (upper) horizontal antenna 501 and (lower) antenna 502 are utilized. The signals from antennas 501 and 502 are coupled to difference circuit 511, which provides an output signal DIFFERENCE that is the difference between the upper and lower antenna signals. The DIFFERENCE signal from circuit 511 is processed through the channel A portion of receiver 200, detected by the signal detector combination circuit comprised of precision rectifier 542 and signal averaging circuit 546, and coupled through A/D converter 562 to microcontroller 550. The detected signal is transformed and then displayed at liquid-crystal display 230.

In the null locating mode of operation, (vertical) antenna 503 is utilized. When the axis of antenna 503 is physically oriented to point directly at the radiated signal source, the output signal from antenna 503 is reduced to "zero" or a null response, because the direction of the magnetic lines of flux are orthogonal to the axis of antenna 503. This null signal is coupled through channel A, detected by the above-described signal detector combination circuit, and then coupled to microcontroller 550, whereby an operator locates and traces the underground object by following the null (reduction in signal) as it is displayed at liquid-crystal display 230.

In order to measure the depth of an underground object, the detected signals from both horizontal antennas 501 and 502 are utilized. The signal LOWER from antenna 502 is processed through the channel A circuitry, and the signal UPPER is processed through the channel B circuitry. The two signals are detected by the respective combination signal detectors comprised of precision rectifier 542 and signal averaging circuit 546 for channel A, and precision rectifier 544 and signal averaging circuit 548 for channel B. Each detected signal is then coupled through A/D converter 562 to microcontroller 550. The depth of (i.e., the distance to) the radiating signal source (underground object) is computed by microcontroller 550, by calculating the ratio of the signal from channel A relative to the signal from channel B. The ratio is multiplied by a correction coefficient, which compensates for gain error differences between channels A and B. The result is subtracted from "1" and the reciprocal is derived. This result is then multiplied by a coefficient equal to the distance between the axes of antennas 501 and 502. Thus, the distance to the underground object is derived.

Power Saving

Instrument power will shut down following approximately ten minutes of no key activity by the operator.

Power On Self Test

Whenever power is applied, the instrument performs a comprehensive self-test sequence to insure operational fitness. [i.e., POST, Power-on Self Test] This test sequence requires approximately twelve seconds to complete. When a given test uncovers an error condition the operator is notified by an audio beep and the display of an error message. An error message consists of an error number in the format "Enn" on alphanumeric display 379 where "nn" is an error number from 00 to 99. Numeric display 378 contains a three digit module number. These two numbers in conjunction identify the error. The entire error message remains on the display until the operator clears it. The error is cleared by hitting any key except ON/OFF. For example, error codes may be provided to indicate a stuck key on the keyboard a RAM or ROM error, and deviations is the frequencies generated by the frequency synthesizer.

Self-Integrity Testing

At regular times during normal operation, the receiver performs various self-integrity tests. When a particular self-integrity test indicates an error condition, the operator is notified by an audio beep and the display of an error message. An error message consists of an error number in the format "Enn" on alphanumeric display 379 where "nn" is an error number from 00 to 99. Numeric display 378 contains a three digit module number. These two numbers in conjunction identify the error. The entire error message remains on the display until the operator clears it. The error is cleared by hitting any key except ON/OFF.

Battery Power Status

At regular intervals, the receiver tests the battery to insure proper operating voltage. In the event a low voltage condition is discovered, the operator is notified by means of an audio beep and the display of a "low battery" message on the LCD for four seconds. The "low battery" message consists of the legend "LOB" on alphanumeric display 379 and a flashing "9999" on numeric display 378. After four seconds the instrument resumes normal operation.

Tool Beacon Roll Angle

As described in the above-identified applications entitled "Angle Sensor For A Steerable Boring Tool" U.S.

patent application Ser. No. 07/539,699 and "Angle Sensor Using Thermal Conductivity For A Steerable Boring Tool" U.S. patent application Ser. No. 07/539,551, the orientation of the angled blade of a drill bit of an underground boring tool determines the direction in which the boring tool will advance when it is thrust through the ground without rotation. Thus, in order to appropriately steer the boring tool in a particular direction, the orientation of the angled blade must be known accurately and presented to the operator. Underground boring tool beacons automatically transmit their current "roll" angle at predetermined periodic intervals. When the receiver is in the BEACON mode, the roll angle signal is received by the receiver and displayed on angle-display 389.

The roll angle, as received, is quantized into sixteen parts and angle-display 389 consist of eight segments of 22.50° each.

Figure 21:
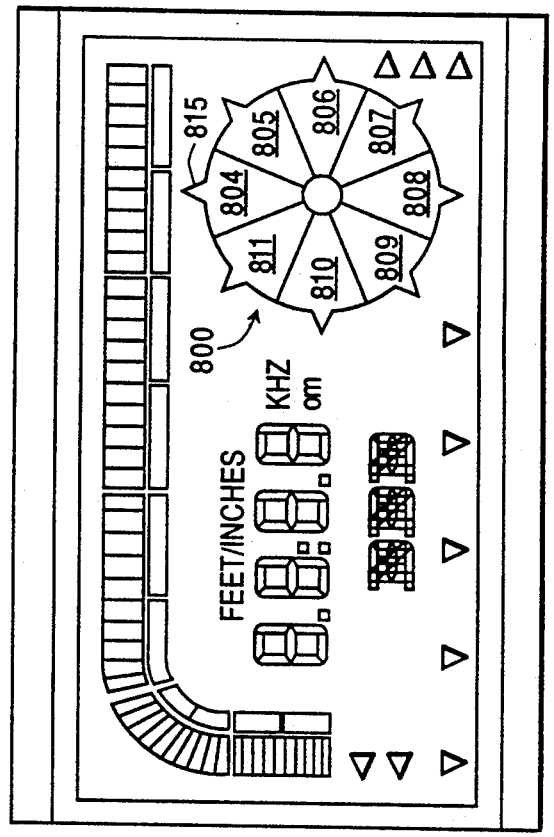
FIG. 21 illustrates an angle display of the receiver in accordance with one embodiment of the invention.

FIG. 21 illustrates an angle display of the receiver in accordance with one embodiment of the invention. Angle display 800 includes eight LCD segments 804-811. Each of the LCD segments 804-811 includes a pointer 815. The pointers are fixed at 0°, 45°, 90°, etc. Each of the LCD segments 804-811 represents an interval of 45°. Thus, display segment 804 indicates angles between −22.5° and +22.5°; display segment 805 between +22.5° and 67.5°,; etc. Roll angles which correspond to one of the eight pointer angles are indicated by lighting the corresponding segment. Thus, to indicate an angle of 45°, segment 805 would be lit. The remaining eight intermediate angles are indicated by displaying the two adjacent principal angle segments. Thus, to indicate a roll angle of 22.5°, LCD segments 804 and 805 are illuminated.

It will be recognized that the above-described display is only one example of how the roll angle may be displayed and the invention is not limited in this respect. For example, a LCD digital readout of the roll angle may be provided. Additionally, a sixteen segment LCD may be utilized. A beep is sounded whenever receiver 300 receives an angle code from the underground boring tool. This audible indication provides a positive assurance to the operator that the receiver is in fact continuing to receive angle data from the underground boring tool.

Control Keys

All control keys (with the exception of the ON/OFF key) auto-repeat if the key is held in the depressed position. Holding a key depressed for more than 1 second causes the action invoked by that key to be repeated at a moderate rate. After 5 repetitions the repeat rate increases to its upper limit. This continues as long as the key remains depressed. The actual repeat rate varies from function to function. For example, the maximum repeat rate is higher when adjusting gain and lower when adjusting frequency.

The Mode key sequentially steps through the six modes of the receiver. These comprise five operating modes—Power Mode, Active Mode, Beacon Mode, Radio-Wide Band Mode, and Radio-Narrow Band Mode—and a Setup mode.

The Function key sequentially steps through various functions in the selected mode. These functions are not identical from mode to mode, but certain of them are the same for all operating modes. These include the Operating Function, which is always selected when a new operating mode is entered, the Antenna Function, which allows selection of an antenna configuration, and the Volume Function, which allows adjustment of speaker volume.

The Up-arrow and Down-arrow keys are used to step through selections within functions and raise and lower adjustments such as receiver gain and speaker volume.

The Depth key is used for measuring the depth of underground conductors or transmitters, and also for certain special functions.

More specifically, the functions that can be selected in the various modes are as follow. In the Active Mode, Beacon Mode, and Radio-Narrow Band Mode, the following functions are available:
Operate Function
Opmode Function
Audio Function
Frequency Function
Variable Frequency Function
Volume Function
Recall Function
Save Function In the Power Mode and Radio-Wide Band Mode, the following functions are available:
Operate Function
Opmode Function
Audio Function
Volume Function
Recall Function
Save Function In the Setup Mode, the following functions are available:
Sensitivity Function
Power Type Function
Distance Units Function The operations performed by the arrow keys and depth key in the various functions, and the displays on the LCD, are described below.

In the Operate function the alphanumeric display shows "OPR". The numeric display shows the received signal strength as a number, the signal-strength bar graph indicates the signal strength as a bar, and the signal-gain bar graph indicates the gain setting as a bar. The up-arrow key increases signal gain and the down-arrow key decreases it. Pressing both arrow keys simultaneously sets the signal gain to a level that gives a signal strength display of 50% of full scale. Pressing the Depth key causes the alphanumeric display to show "DPT" and the numeric display to be blank. Then the depth of the signal source is computed and displayed on the numeric display.

In the Opmode function, one of three flags on the right side of the LCD points to the active opmode (TWIN, PEAK, or NULL) at all times. When the receiver is set to the Opmode function, a corresponding three-letter mnemonic is also shown on the alphanumeric display. The numeric display shows the received signal strength as a number, the signal-strength bar graph indicates the signal strength as a bar, and the signal-gain bar graph indicates the gain setting as a bar.

Pressing the Up-arrow key steps up through the opmodes in the following order: NULL, PEAK and TWIN. Pressing the Down-arrow key steps through the modes in the reverse order.

Pressing the Depth key computes and displays depth, as described for the Operating mode.

In the Audio function, the operator can select one of three kinds of audible outputs that indicate signal strength. The first kind is indicated by the mnemonic AUA on the alphanumeric display. When AUA is selected, the operator hears whatever audio-frequency modulation may be present on the received signal. The second kind of audible output is indicated by the mnemonic AUF on the alphanumeric display. When AUF is selected, the operator hears a series of processor-synthesized clicks whose frequency is proportional to signal strength. The third kind of audible output is indicated by the mnemonic AUB on the alphanumeric display. When AUB is selected, the operator hears both the audio-frequency modulation and the clicks at the same time. The numeric display shows the audio volume as a number, the signal-strength bar graph indicates the signal strength as a bar, and the signal-gain graph indicates the gain setting as a bar.

Pressing the Up-arrow key steps up through the three kinds of audible output in the following order: AUA, AUF and AUB. Pressing the Down-arrow key steps through the three kinds in the reverse order.

Pressing the Depth key has no effect in this function.

In the frequency function, the alphanumeric display shows one of four "frequency slot" mnemonics: FQ1, FQ2, FQ3 or FQ4. The numeric display shows the nominal frequency. The signal-strength bar graph indicates the signal strength as a bar, and the signal-gain bar graph indicates the gain setting as a bar.

Pressing the Up-arrow key steps up through the four frequency slots in the following order: FQ1, FQ2, FQ3 and FQ4. Pressing the Down-arrow key steps through the four frequency slots in the reverse order.

Pressing the Depth key has no effect in this function.

In the variable frequency function, the alphanumeric display shows one of the four mnemonics VF1, VF2, VF3 or VF4. The number in the mnemonic is the same as the number of the frequency slot selected in the frequency function. The numeric display shows the nominal frequency selected for the selected frequency slot. The signal-strength bar graph indicates the signal strength as a bar, and the signal-gain bar graph indicates the gain setting as a bar.

Pressing the Up-arrow key steps up through all permissible frequencies for the selected mode. Pressing the Down-arrow key steps down through all permissible frequencies.

Pressing the Depth key has no effect in this function.

In the volume function, the alphanumeric display shows the mnemonic VOL. The signal-gain bar graph indicates the volume setting. The numeric display shows the signal strength, and the signalstrength bar shows the signal strength as a bar.

Pressing the Up-arrow key increases speaker volume. Pressing the Down-arrow key decreases speaker volume. Pressing both arrow keys simultaneously sets the speaker volume to a prescribed nominal setting.

Pressing the Depth key has no effect in this function.

In the recall function, the alphanumeric display shows the mnemonic RCL. The signal-strength bar graph indicates the signal strength as a bar, and the signal-gain bar graph indicates the gain setting as a bar. The numeric display shows the number of a configuration data set. Each of the operational modes [ACTIVE, BEACON, POWER, RADIO WB, and RADIO NB] has three configuration data sets, which are stored in Electrically Erasable and Programmable Read-Only Memory (EEPROM).

The configuration data sets each comprise the following information for the corresponding mode: all internal gain control settings; the selected antenna mode; the selected audio operation mode [i.e., AM, FM, or AM/FM]; the four frequencies for the four frequency slots; and the most recently selected frequency slot.

Pressing the Up-arrow key steps up through the three configuration data sets for the current mode. Pressing the Down-arrow key steps down through the data sets.

Pressing the Depth key replaces the current configuration with the configuration in the selected data set.

In the save function, the alphanumeric display shows the mnemonic SAV. The signal-strength bar graph indicates the signal strength as a bar, and the signal-gain bar graph indicates the gain setting as a bar. The numeric display shows the number of one of three configuration data sets for the current mode.

Pressing the Up-arrow key steps up through the three configuration data sets for the current mode. Pressing the Down-arrow key steps down through the data sets.

Pressing the Depth key stores the current configuration in EEPROM, replacing the previous data set.

The operation of the receiver will be explained below with reference to FIGS. 22(A)–22(D). After power-up (ST1), the initialization of timers (ST2), and the restoration of the previous transmitter configuration (ST3), the transmitter circuitry waits for an interrupt. If a keyboard interrupt is generated as at ST5, control passes to ST6 where the task is queued and control returns to ST4. If an SPI interupt is generated as at ST7, control passes to ST8 and the data is sent to the LCD. Control then returns to ST4. If an SCI interrupt is generated as at ST9, the data is read at ST10 and control returns to ST4. If a real-time interrupt is generated as at ST11, control passes to ST12 where a determination is made as to whether the interrupt is from the system timers. If not, control passes to ST13 and the data is obtained from the A/D converter. Control then passes to ST14 where the data is queued for the LCD. Control then returns to ST4.

If at ST12 an interrupt is from the system timers, control passes to ST15. At ST15, the task is executed. For set-up mode (ST16), power type function (ST17), distance units function (ST18), and sensitivity function (ST19) are executed. For error handling (ST20), the error code is displayed (ST21), and the LCD is cleared (ST23) after a keystroke is detected (ST23). For a battery test (ST24), the voltages are checked (ST25) and if an error is detected, the error code is detected (ST26). For a power on self-test (POST) (ST27), an error code is displayed if an error is detected (ST28). For an LCD update (ST29), the data is sent to the LCD (ST30). For monitoring the gain (ST31), a beep is sounded if the gain is out of the operating range (ST32). For other modes, the actions shown in FIGS. 22(C) and 22(D) are taken.

The actions taken in FIGS. 22(C) and 22(D) will be described below. In operate mode, if no key is pressed, the signal strength is measured. If the mode key is pressed, the operate function is set. If the function key is pressed, the function is set to Opmode. If the up-arrow key is pressed, the gain is raised 5% of full scale. If the down arrow key is pressed, the gain is lowered 5% of full scale. If the depth key is pressed, the depth is measured and displayed. If both the up and down arrow keys are pressed, the gain is set for 50% of signal strength.

In Opmode, if no key is pressed, the signal strength is measured. If the mode key is pressed, the operate function is set. If the function key is pressed, the function is set to audio. If the up arrow key is pressed, the next opmode is stepped to, i.e. Twin, Null, or Single. If the down arrow key is pressed, the previous opmode is stepped to. If the depth key is pressed, the depth is measured and displayed. If both the up and down arrows are pressed, no action is taken.

In audio, if no key is pressed, the signal strength is measured. If the mode key is pressed, the operate function is set. If the function key is pressed, the function is set to frequency. If the up arrow key is pressed, the next audio option is stepped to, i.e. AM, FM, or both. If the down arrow key is pressed, the previous audio option is stepped to. If the depth key or both the up and down arrow keys are pressed, no action is taken.

In the frequency function, if no key is pressed, the signal strength is measured. If the mode key is pressed, the operation function is set. If the function key is set, the function is set to variable frequency. If the up arrow key is pressed, the next frequency slot is stepped to, i.e. FQ1, FQ2, FQ3, or FQ4. If the down arrow key is pressed, the previous frequency slot is stepped to. If the depth key or both the up and down arrow keys are pressed, no action is taken.

In the variable frequency function, if no key is pressed, the signal strength is measured. If the mode key is pressed, the operate function is set. If the function key is pressed, the function is set to volume. If the up arrow is pressed, the frequency is raised 1 kHz. If the down arrow key is pressed, the frequency is lowered 1 kHz. If the depth key or both the up and down arrow keys are pressed, no action is taken.

In the volume function, if no key is pressed, the signal strength is measured. If the mode key is pressed, the operate function is set. If the function key is pressed, the function is set Recall. If the up arrow key is pressed, the volume is raised 5%. If the down arrow key is pressed, the volume is lowered 5%. If the depth key is pressed, no action is taken. If both the up arrow and the down arrow are pressed, the volume is set to 50% of the maximum volume.

In the recall function, if no key is pressed, the signal strength is measured. If the mode key is pressed, the operate mode function is set. If the function key is pressed, the function is set to Save. If the up arrow is pressed, the the next slot index is stepped to, i.e. 1, 2, or 3. If the down arrow key is pressed, the slot index is lowered. If the depth key is pressed, the configurations are recalled from the selected slot. If both the up arrow and down arrow keys are pressed, no action is taken.

In the Save function, if no key is pressed, the signal strength is measured. If the mode key is pressed, the operate function is set. If the function key is pressed, the function is set to operate. If the up arrow key is pressed, the slot index is raised, i.e. 1, 2, or 3. If the down arrow key is pressed, the slot index is lowered. If the depth key is pressed, the configuration is saved in the selected slot. If both the up arrow and the down arrow are pressed, no action is taken.

The distinctive appearance of the receiver, with its cut-out wand, illustrates the design dictum that form should follow function. The innovation of putting a swivel between the operator console and the wand makes the receiver convenient to hold. The design and arrangement of the keys on the console makes it easy to operate the receiver single-handed. The consistent usage of the mode key, the function key within each mode, and of the arrow keys within each function, give a characteristic user-friendly quality to the interface between the operator and the receiver. This is aided by the wide variety of information presented on the unique LCD in an easily grasped format.

What has been described here are the preferred embodiments of the present invention. Other embodiments will be apparent to one of ordinary skill in the art. The present invention is not limited to the embodiments described herein, but is only limited by the claims appended hereto.

What is claimed is:

1. A locator transmitter for transmitting a signal of a predetermimed AC frequency suitable for tracing underground lines, said locator transmitter comprising:
   a generator for generating a selected one of a plurality of different available frequencies, said generator providing a first output signal for use in transmitting to an underground line, and a second output signal for tuning a filter;
   a tunable filter receiving the selected frequency defined by said first output signal of the generator and for filtering the first output signal, and for receiving the second output signal for tuning the filter to provide a precise AC signal having a frequency defined by the frequency of the first output signal;
   an antenna for radiating said precise AC signal;
   processor means coupled to said generator for controlling said generator to generate said first and second output signals; and
   automatic tuning means coupled to said antenna and to said processor means for automatically tuning said antenna in response to a selection of one of said different available frequencies to tune the resonant frequency of the antenna in order to maximize the power of the signal radiated from the antenna, thereby increasing the distance at which said lines may be traced.

2. The locator transmitter in accordance with claim 1 wherein said antenna comprises a coil having a plurality of taps.

3. The locator transmitter in accordance with claim 2 wherein said automatic tuning means comprises a plurality of capacitors which are selectively coupled across the taps of said coil in response to said processor means for tuning said antenna.

4. The locator transmitter in accordance with claim 1 wherein said automatic tuning means comprises a digitally tuned tank circuit.

5. The locator transmitter in accordance with claim 1, wherein said generator comprises a digital frequency synthesizer having a first programmable counter for determining the frequency of a digital signal output therefrom, and a second programmable counter for generating a digital signal for controlling the filter characteristics of the filter.

6. A method of tuning an antenna for use in a locator transmitter of the type that outputs a signal of a precision frequency suitable for tracing an underground line, comprising the steps of:
   receiving by said locator transmitter a user selected frequency and in response thereto programming a multi-frequency generator to generate the user selected frequency;
   coupling the selected frequency to a low pass filter having a narrow bandpass of about 20 Hz or less and tuning the low pass filter to produce a filtered signal of the selected frequency to avoid power line frequencies and harmonics thereof from interfering with the selected and filtered frequency; and tuning said antenna so that the resonant frequency of the antenna is tuned so as to maximize the power of a signal of said selected and filtered frequency when said selected and filtered frequency is radiated from said antenna, whereby a precision frequency and narrow bandwidth signal is transmitted to the underground line.

7. A method in accordance with claim 6, wherein said antenna includes a coil having a plurality of taps, said step of tuning said antenna further comprising the step of selectively connecting one or more capacitors to the taps on said antenna coil.

8. A method in accordance with claim 6, further including comparing the user selected frequency with a look-up table to determine if a power line frequency or harmonic thereof would interfere with the user selected frequency, and if not, programming the multi-frequency generator to generate the selected frequency.

9. A method in accordance with claim 6, further including tuning the antenna to the selected frequency and thereafter amplitude modulating the selected frequency with digital signal codes.

10. A method in accordance with claim 9 further including modulating the selected frequency with a digital signal code identifying a mode of operation of the transmitter locator, and further including receiving the code modulated frequency at a receiver and tuning a receiver antenna in response thereto.

11. A method in accordance with claim 10, further including modulating the selected frequency with a code identifying a voice frequency communication mode, and tuning the receiver from a narrow band receiving mode to a wide band receiving mode.

12. A method in accordance with claim 6, further including tuning the transmitter antenna and a corresponding receiver antenna for narrow band operation during locating an underground object, and switching at least the receiver to wide band operation during voice communication.

13. A locator transmitter for transmitting a signal of a predetermined frequency suitable for tracing an underground line, said locator transmitter comprising:
a digital frequency synthesizer for generating one of a plurality of available digital signal frequencies;
a processor responsive to an input for programming the digital frequency synthesizer to generate a selected digital signal frequency;
a filter for converting the selected digital signal frequency to a corresponding AC signal frequency;
said filter being tunable for changing center frequency characteristics thereof based on a frequency programmed by said processor to be generated by said digital frequency synthesizer;
an antenna for radiating said AC signal frequency produced by said filter; and
tuning means programmable by said processor and coupled to said antenna for automatically tuning said antenna based on a frequency of the selected digital signal frequency so that the resonant frequency of the antenna is tuned in order to maximize the power of the signal radiated from the antenna, thereby increasing the distance at which said underground line may be traced.

14. The locator transmitter of claim 13 wherein said frequency synthesizer generates a digital signal coupled to said filter for tuning the filter.

15. The locator transmitter of claim 13 wherein said processor is responsive to an input by an operator of the locator transmitter for programming the frequency synthesizer to provide a) desired frequency output coupled to the filter, and b) a signal coupled to the filter for tuning the filter, and said processor is responsive to the operator input for tuning the antenna.

16. The locator transmitter of claim 13 wherein said processor is programmed to tune the antenna to different ranges of frequencies, and when a frequency is selected, the processor determines if the selected frequency is in a range to which the antenna is tuned, and if not, the processor retunes the antenna to a frequency range that includes the selected frequency.

17. A locator transmitter for transmitting a signal of a predetermined frequency suitable for tracing underground lines, said locator transmitter comprising:
a console having a first control for inputting a frequency for transmitting and a second control for inputting a power setting for such transmission;
a digital frequency synthesizer for generating one of a plurality of available digital signal frequencies;
a processor responsive to an operator input via the console first control for programming the digital frequency synthesizer to generate a selected digital signal frequency, and responsive to the console second control to establish a transmitter power corresponding to an operator input via the console;
a filter for converting the selected digital signal frequency to a corresponding AC signal frequency;
said filter being tunable by a signal from said digital frequency synthesizer for changing center frequency characteristics thereof based on a selection of a frequency to be generated by said digital frequency synthesizer;
a tunable antenna for radiating said selected AC signal frequency at the selected power;
a connector for connecting thereto an accessory cable for radiating the selected AC signal frequency;
tuning means programmable by said processor and coupled to said antenna for automatically tuning said antenna to said AC signal frequency so that the resonant frequency of the antenna is tuned in order to maximize the power of the signal radiated from the antenna, thereby increasing the distance at which said lines may be traced; and
a detector for detecting connection of the accessory cable to said connector, and said processor is responsive to the detection by said detector for coupling the AC frequency signal to the accessory cable rather than the antenna.

18. The locator transmitter of claim 17 wherein said processor provides a visual indication on said console of the connection of the accessory cable to the connector.

* * * * *